(12) United States Patent
Nakachi et al.

(10) Patent No.: US 12,159,489 B2
(45) Date of Patent: Dec. 3, 2024

(54) IMAGE RECOGNITION SYSTEM, IMAGE RECOGNITION SERVER, AND IMAGE RECOGNITION

(71) Applicant: NIPPON TELEGRAPH AND TELEPHONE CORPORATION, Tokyo (JP)

(72) Inventors: Takayuki Nakachi, Musashino (JP); Yitu Wang, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 394 days.

(21) Appl. No.: 17/596,071

(22) PCT Filed: Jun. 6, 2019

(86) PCT No.: PCT/JP2019/022641
§ 371 (c)(1),
(2) Date: Dec. 2, 2021

(87) PCT Pub. No.: WO2020/246010
PCT Pub. Date: Dec. 10, 2020

(65) Prior Publication Data
US 2022/0343691 A1    Oct. 27, 2022

(51) Int. Cl.
*G06V 40/50*    (2022.01)
*G06F 21/60*    (2013.01)
(Continued)

(52) U.S. Cl.
CPC ............ *G06V 40/53* (2022.01); *G06F 21/602* (2013.01); *G06V 10/772* (2022.01); *G06V 10/774* (2022.01); *G06V 40/172* (2022.01)

(58) Field of Classification Search
CPC ... G06F 21/602; G06V 10/772; G06V 40/172
See application file for complete search history.

(56) References Cited

U.S. PATENT DOCUMENTS

| 11,769,316 B2 * | 9/2023 | Yu .................... G06V 40/169 |
| 2005/0102246 A1 | 5/2005 | Movellan et al. |
| 2019/0095787 A1 * | 3/2019 | Kung .................. G06V 10/764 |

FOREIGN PATENT DOCUMENTS

| JP | 200544330 A | 2/2005 | |
| JP | 7072774 B2 * | 5/2022 | ........... C09K 19/544 |

OTHER PUBLICATIONS

Patel, Vishal M., et al. "Dictionaries for image and video-based face recognition." JOSA A 31.5 (2014): 1090-1103. (Year: 2014).*

(Continued)

*Primary Examiner* — Madhuri R Herzog
(74) *Attorney, Agent, or Firm* — Harness, Dickey & Pierce, P.L.C.

(57) ABSTRACT

An object of the present invention is to provide an image recognition system, an image recognition server, and an image recognition method having a new high security framework that can achieve utilization of multi-device diversity. The image recognition system according to the present disclosure includes a computationally non-intensive encryption algorithm based on random unitary transformation and achieves a high level of security. In addition, the image recognition system achieves high recognition performance by using ensemble learning to integrate recognition results based on the dictionaries of different devices.

3 Claims, 22 Drawing Sheets

(51) Int. Cl.
*G06V 10/772* (2022.01)
*G06V 10/774* (2022.01)
*G06V 40/16* (2022.01)

(56) References Cited

OTHER PUBLICATIONS

Yong Xu et al., "A survey of dictionary learning algorithms for face recognition", IEEE Access 2017. vol. 5, 2017. pp. 8502-8514.
John Wright et al., "Robust face recognition via sparse representation", IEEE Transactions on Pattern Analysis and Machine Intelligence. vol. 31, No. 2, 2009. pp. 210-227.
Takayuki Nakachi et al., "Privacy-preserving network BMI decoding of covert spatial attention", Proc. of IEEE ICSPCS 2018. Dec. 17, 2018.
Takayuki Nakachi and Hitoshi Kiya, "Secure Computation of Sparse Coding for Privacy Protection", IEICE Technical Report. vol. 2018-AVM-101, No. 2, 2018.
Ibuki Nakamura et al. "A Generation Scheme of Protected Templates Based on Orthogonal Transforms for Biometrics", IEICE Technical Report. vol. 2014-AVM-86, No. 2, 2014.

\* cited by examiner

[11]

[13]

ALGORITHM 1: EDGE AND CLOUD-ASSISTED SAFE SPARSE REPRESENTATION FOR FACIAL RECOGNITION

1: [DICTIONARY LEARNING STAGE]
2: TRAINING IMAGE $d^i_{(i,n)}$ IS ENCRYPTED ACCORDING TO MATH. 2-12 AND TRANSMITTED TO SPECIFIED EDGE SERVER.
3: EDGE SERVER CREATES ENCRYPTED DICTIONARY $\tilde{D}^j$ ACCORDING TO MATH. 2-13 AND UPLOADS ENCRYPTED DICTIONARY TO CLOUD.
4: [RECOGNITION STAGE]
5: TESTING IMAGE $y_K$ IS ENCRYPTED ACCORDING TO MATH. 2-12 AND TRANSMITTED TO SPECIFIED EDGE SERVER.
6: EDGE SERVER UPLOADS NORMALIZED ENCRYPTED TESTING VECTOR $y^k_j$ TO CLOUD.
7: EACH MEMBER CLASSIFIER $j \in N$ SOLVES MATH. 2-14 USING OMP TO FIND SPARSE REPRESENTATION $\tilde{x}^{(j,k)}$, FURTHER, EACH MEMBER CLASSIFIER j CONCURRENTLY SOLVES MATH. 2-5 (OR MATH. 2-17) TO CALCULATE RECONSTRUCTION ERROR $\tilde{r}^j_i(\tilde{y}^k)$.
8: CLOUD COMBINES RESULTS AND SOLVES MATH. 2-6 TO GENERATE RECOGNITION RESULT.
(DETERMINES CLASS WHICH GIVES SMALLEST RECONSTRUCTION ERROR)

RECOGNITION ACCURACY

| | |
|---|---|
| Device 1 (LD) | 0.9430 |
| Device 2 (8 training samples) | 0.7540 |
| Device 3 (10 training samples) | 0.8482 |
| Device 4 (10 training samples) | 0.8491 |
| Device 5 (12 training samples) | 0.9009 |
| Cloud | 0.9544 |

| Training Time (s) | | Testing Time (s) | |
|---|---|---|---|
| Proposed | 7.29 | Proposed | $1.64 \times 10^{-3}$ |
| SPCANET | 5780 | SPCANET | 1.20 |
| LC-KSVD | 4.84 | LC-KSVD | $1 \times 10^{-4}$ |

Fig. 22

IMAGE RECOGNITION SYSTEM, IMAGE RECOGNITION SERVER, AND IMAGE RECOGNITION

CROSS-REFERENCE TO RELATED APPLICATIONS

This application is a 371 U.S. National Phase of International Application No. PCT/JP2019/022641 filed on Jun. 6, 2019. The entire disclosure of the above application is incorporated herein by reference.

TECHNICAL FIELD

The present disclosure relates to an image recognition system, an image recognition server, and an image recognition method for image recognition utilizing edge cloud computing.

BACKGROUND ART

Facial recognition is theoretically and practically important, and has long been vigorously studied in a wide range of regions including virtual reality applications and IoT networks. Classification algorithm based on sparse representation, which is inspired by the sparse mechanism of the human visual system, has attracted much attention. For example, NPL 1 discloses employing K-Singular Value Decomposition (K-SVD) algorithm to learn a feature dictionary, applying Orthogonal Matching Pursuit (OMP) to find a sparse representation of a testing image, and using a Support Vector Machine (SVM) for facial recognition.

Another technique commonly employed for facial recognition is deep learning, which has been demonstrated to be effective in extracting deep hierarchical features. For example, it is possible to improve facial recognition performance by using Convolutional Neural Network (ConvNets), which is one of technologies of deep learning, to extract visual features. However, training in deep learning is highly computationally intensive and requires large quantities of training data.

On the other hand, edge computing and cloud computing are promising techniques to provide cloud computing capabilities at edges proximate to mobile users, while reducing traffic bottlenecks between a cloud and edges of a core network and a backhaul network. Such edge cloud computing makes it possible to not only accommodate increased computing load, but also provide a wide variety of services by collecting data from mobile devices. For example, the edge cloud computing can be used in the facial recognition described above to allow offloading some of computing tasks onto an edge and a cloud to improve computational efficiency (to reduce computational load) in the facial recognition.

CITATION LIST

Non Patent Literature

NPL 1: Y. Xu, Z. Li, J. Yang, and D. Zhang, "A Survey of Dictionary Learning Algorithms for Face Recognition," IEEE Access, vol. 5, pp. 8502-8514 April 2017.

NPL 2: J. Wright, A. Yang, A. Ganesh, S. Sastry, and Y. Ma, "Robust Face Recognition via Sparse Representation," IEEE Trans. Pattern Anal. Machine Intell., vol. 31, no. 2, pp. 210-227, February 2009.

NPL 3: T. Nakachi, H. Ishihara, and H. Kiya, "Privacy-preserving Network BMI Decoding of Covert Spatial Attention," Proc. IEEE ICSPCS 2018, pp. 1-8, December 2018.

SUMMARY OF THE INVENTION

Technical Problem

However, utilizing edge cloud computing in facial recognition has the following problems.

(1) To prevent data leakage due to human errors or accidents, high level of security such as privacy protection is required.

(2) Insufficient utilization of multi-device diversity (for improvement of recognition accuracy).

An object of the present invention is to provide an image recognition system, an image recognition server, and an image recognition method having a new high security framework that can achieve utilization of multi-device diversity, to solve the above-described problems.

Means for Solving the Problem

To achieve the object, the image recognition system according to the present disclosure uses a random unitary matrix to ensure a high level of security from end to end, and uses ensemble learning based on results from each device (user terminal) to increase recognition accuracy.

Specifically, an image recognition system according to the present disclosure is an image recognition system, including N terminals (N is an integer not less than 2), M transfer servers (M is an integer not less than 1), and an image recognition server, and in the image recognition system, when an image $y_i^j$ is expressed, by using a dictionary matrix $D_i^j$ being an M×K matrix having, as elements thereof, K (K>M) bases, and a sparse coefficient $X_i^j$ being a K-dimensional vector, as $y_i^j = D_i^j \cdot X_i^j$, where i is a class to which an image to be identified belongs, and j and k (k∈j) are numbers of the terminals, the terminals are configured to encrypt a testing image using a random unitary matrix Qp generated by using a key p, to generate an encrypted testing image, and transfer the encrypted testing image to a specified one of the transfer servers, the transfer servers are configured to downsample the encrypted testing image, transform the encrypted testing image to a one-dimensional encrypted image vector, and transfer the encrypted image vector to the image recognition server, and the image recognition server is configured to use a plurality of encrypted dictionaries generated by encrypting, by using the random unitary matrix Qp, a plurality of dictionaries generated using different training images, to solve, by Orthogonal Matching Pursuit, an optimization problem represented by Math. C1 for each of the plurality of encrypted dictionaries, to estimate a class, to which the encrypted image vector belongs, for each of the plurality of the encrypted dictionaries, and is further configured to perform ensemble learning on the class estimated for each of the plurality of the encrypted dictionaries to determine a single class to which the encrypted image vector belongs:

$$\hat{x}^{(j,k)} = \underset{x^j}{\operatorname{argmin}} \left\| \overline{D}^j X^j - \overline{y}^k \right\|_2 \quad s.t. \quad \left\| X^j \right\|_0 \leq \epsilon \tag{C1}$$

where, $\overline{D}^j$ is the encrypted dictionary of a terminal of number j, $X^j$ is a sparse coefficient of the terminal of number j, and $\overline{y}^k$ is the encrypted image vector generated by downsampling the encrypted testing image from the terminal of number k (k∈j) and transforming the encrypted testing image to a one-dimensional vector.

[Math. C1]

An image recognition server according to the present disclosure includes, an input unit configured to receive an encrypted image vector and a plurality of encrypted dictionaries, the encrypted image vector being generated by downsampling an encrypted testing image and transforming the encrypted testing image to a one-dimensional vector, the encrypted testing image being generated by encrypting a testing image using a random unitary matrix Qp generated by using a key p, the plurality of encrypted dictionaries being generated by encrypting, by using the random unitary matrix Qp, a plurality of dictionaries generated using different training images, and a determination unit configured to solve, by Orthogonal Matching Pursuit, an optimization problem represented by Math. C1 for each of the plurality of encrypted dictionaries, to estimate a class, to which the encrypted image vector belongs, for each of the plurality of the encrypted dictionaries, and further configured to perform ensemble learning on the class estimated for each of the plurality of the encrypted dictionaries to determine a single class to which the encrypted image vector belongs.

An image recognition method according to the present disclosure is an image recognition method performed in an image recognition system including N terminals (N is an integer not less than 2), M transfer servers (M is an integer not less than 1), and an image recognition server, the method including, when an image $y_i^j$ is expressed, by using a dictionary matrix $D_i^j$ being an M×K matrix having, as elements thereof, K (K>M) bases, and a sparse coefficient $X_i^j$ being a K-dimensional vector, as $y_i^j = D_i^j \cdot X_i^j$, where i is a class to which an image to be identified belongs, and j and k (k∈j) are numbers of the terminals, encrypting, by the terminals, a testing image using a random unitary matrix Qp generated by using a key p, to generate an encrypted testing image, and transferring the encrypted testing image to a specified one of the transfer servers, downsampling, by the transfer servers, the encrypted testing image, transforming the encrypted testing image to a one-dimensional encrypted image vector, and transferring the encrypted image vector to the image recognition server, and using, by the image recognition server, a plurality of encrypted dictionaries generated by encrypting, by using the random unitary matrix Qp, a plurality of dictionaries generated using different training images, to solve, by Orthogonal Matching Pursuit, an optimization problem represented by Math. C1 for each of the plurality of encrypted dictionaries, to estimate a class, to which the encrypted image vector belongs, for each of the plurality of the encrypted dictionaries, and performing ensemble learning on the class estimated for each of the plurality of the encrypted dictionaries to determine a single class to which the encrypted image vector belongs.

The image recognition system includes a computationally non-intensive encryption algorithm based on random unitary transformation and achieves a high level of security by performing, in encrypted regions, entire processing from the dictionary creation stage to the recognition stage. With the image recognition system, a dictionary can be easily created because complex methods, such as K-SVD, are not used at the dictionary creation stage and machine learning is performed using only encrypted training images. In addition, the image recognition system achieves high recognition performance by using ensemble learning to integrate recognition results based on the dictionaries of different devices.

Thus, the present invention can provide an image recognition system, an image recognition server, and an image recognition method having a new high security framework that can achieve utilization of multi-device diversity.

Effects of the Invention

The present invention can provide an image recognition system, an image recognition server, and an image recognition method having a new high security framework that can achieve utilization of multi-device diversity.

BRIEF DESCRIPTION OF DRAWINGS

FIG. 13 is a diagram for explaining image recognition operation performed by the image recognition system according to the embodiment of the present disclosure.

FIG. 20 is a diagram for explaining effects of the image recognition system according to the embodiment of the present disclosure.

FIG. 22 is a diagram for explaining effects of the image recognition system according to the embodiment of the present disclosure.

DESCRIPTION OF EMBODIMENTS

Embodiments of the present disclosure will be described with reference to the accompanying drawings. The embodiments described below are examples of the present invention and the present invention is not limited to the embodiments described below. Note that components with the same reference signs in the specification and the drawings are assumed to be the same components.

First Embodiment

The present embodiment describes a method and apparatus for concealment computation for sparse coding, for privacy protection.

The method is a concealment computation method for sparse coding which is intended to be used at Edge/Cloud, and allows direct usage of a number of software applications widely used and protection of user's privacy. The method will be described in the following order.

Figure 1:
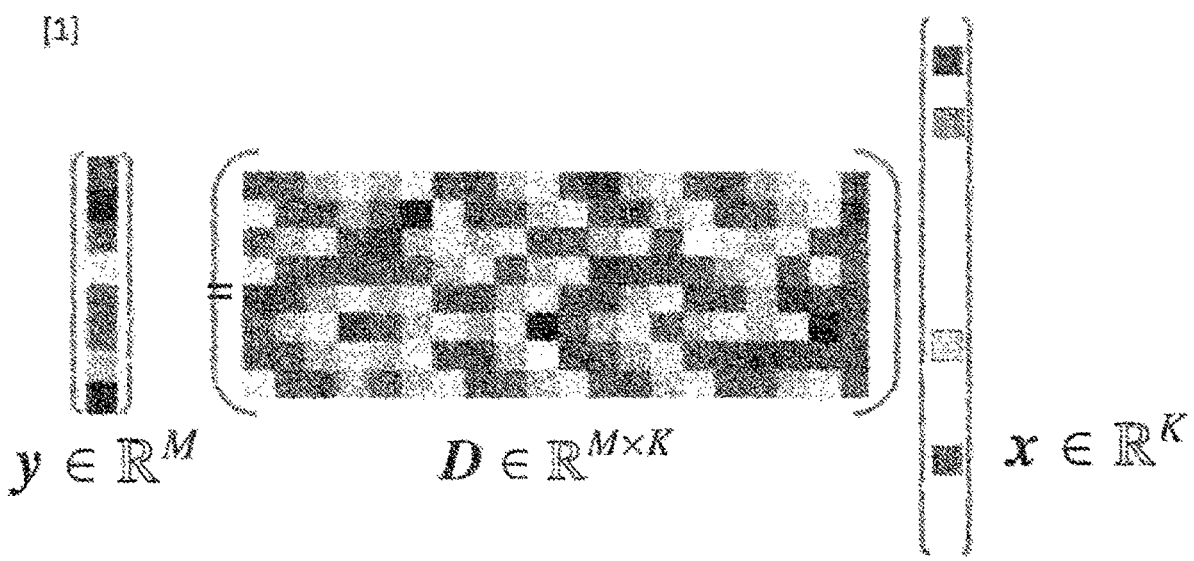
FIG. 1 is a diagram for explaining sparse coding. The sparse coding is a linear system represented by a weighted linear sum of a small number of basis vectors.

(1) Formulation of Sparse Coding
(2) System Configuration for Performing Concealment Computation for Sparse Coding at Edge/Cloud
(3) Concealment Computation Method for Orthogonal Matching Pursuit (OMP) Widely Used as Algorithm for Coefficient Selection 1. Formulation of Sparse Coding In sparse coding, as illustrated in FIG. 1, an M-dimensional observed signal vector

[Math. 0]

$$y \in \mathbb{R}^M \tag{0}$$

is assumed to be expressed as a linear combination of K bases.

[Math. 1]

$$y = Dx \tag{1}$$

where,

[Math. 1-1]

$$D = \{d_1, \ldots, d_K\} \in \mathbb{R}^{M \times K} \tag{1-1}$$

is an M×K dictionary matrix having, as its elements, bases $d_i$ (1≤i≤K) which are column vectors, and

[Math. 1-2]

$$x = \{x_1, \ldots, x_K\} \in \mathbb{R}^K \tag{1-2}$$

represents sparse coefficients. Note that, "K" represents the number of bases used for the linear combination of Equation (1).

Only a small number of the sparse coefficients are non-zero coefficients, and the other large number of coefficients are zero. Such a state in which a small number of non-zero elements exist as compared to the total number of elements is referred to as sparse. A dictionary matrix D is provided in advance or is estimated adaptively by using learning based on observation data.

Typically, an overcomplete dictionary matrix in which the relationship, K>M is satisfied (i.e., the number of bases is larger than the dimensions of the observed signal) is used. For the expression y=Dx when the number of bases is larger than the dimensions of the signal, the uniqueness of x cannot be ensured. Thus, the bases to be utilized to express the observed signal y is typically limited to some bases included in D. That is, when the following expression denotes an $l_0$ norm of x, that is, the number of non-zero components of the vector x,

[Math. 1-3]

$$\|x\|_0 \tag{1-3}$$

sparse coding is typically formulated as the following optimization problem.

[Math. 2]

$$\min_x \|y - Dx\|_2^2 + \lambda \|x\|_0, \quad \lambda > 0 \tag{2}$$

However, this problem is a combinational optimization problem whose optimal solution cannot be obtained without testing all basis combinations, and is known to be NP-hard. Thus, a relaxation problem to $l_1$ norm

[Math. 3]

$$\min_x \|y - Dx\|_2^2 + \lambda \|x\|_1, \quad \lambda > 0 \tag{3}$$

is typically considered. This $l_1$ norm regularized problem can be expressed as a linear programming problem.

The sparse coding can be considered as two separate problems, which are "dictionary design problem (D design)" and "choice of sparse coefficients (x)."

For the dictionary design problem, it is possible to use a dictionary matrix with bases prepared in advance, by using, for example, discrete cosine transform, Fourier transform, wavelet transform, or curvelet transform, or it is possible to use a dictionary matrix obtained by learning bases from signals. Exemplary approaches of dictionary learning for sparse coding include Method of Optimal Direction (MOD) and K-Singular Value Decomposition (K-SVD). MOD uses a pseudo-inverse matrix to minimize a squared error between y and Dx. K-SVD can be regarded as a generalized k-means method and is proposed as an iterative algorithm faster than MOD.

Orthogonal Matching Pursuit (OMP) and Iterative. Reweighted Least Squares (IRLS) are well known as a selection algorithm of sparse coefficients.

2. System Configuration for Concealment Computation for Sparse Coding

Figure 2:
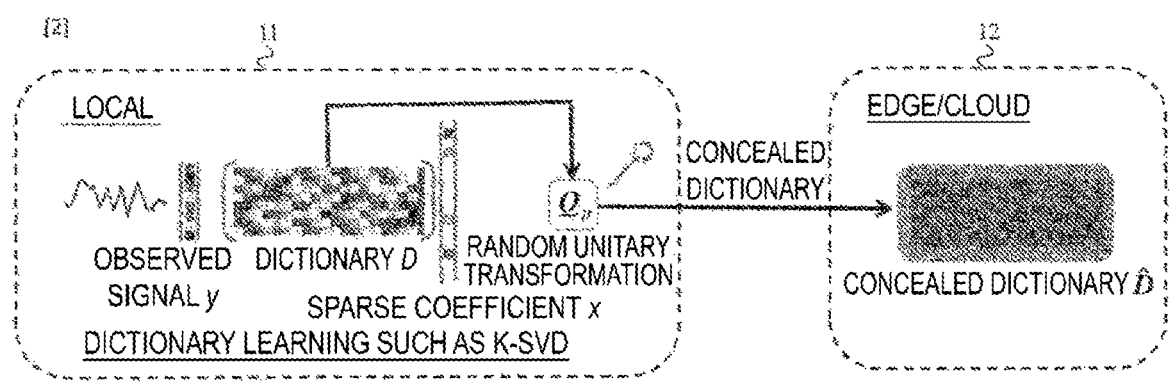
FIG. 2 is a diagram for explaining pre-preparation in a concealment computation method for sparse coding according to an embodiment of the present disclosure. A local processing unit performs dictionary learning and concealment processing on the dictionary.
Figure 3:
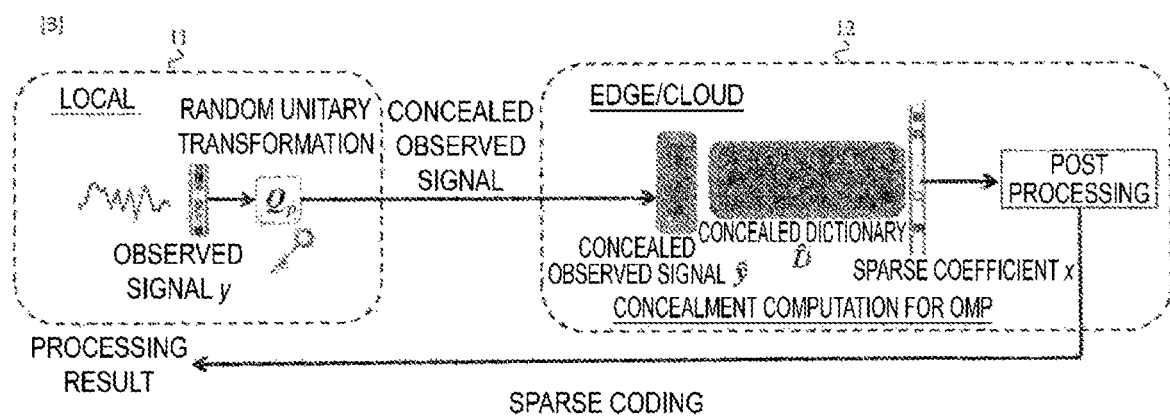
FIG. 3 is a diagram for explaining the concealment computation method for sparse coding according to the embodiment of the present disclosure. An edge/cloud unit performs the concealment computation for sparse coding.

Architecture for performing concealment computation for sparse coding in an edge/cloud processing unit 12 is illustrated in FIGS. 2 and 3.

In the pre-preparation of FIG. 2, a dictionary matrix D is prepared in advance or generated by performing learning by using, for example, K-SVD method, in a local processing unit 11. Subsequently, the dictionary matrix D is transformed to a concealed dictionary matrix,

[Math. 3-1]

$$\hat{D} \tag{3-1}$$

which is transmitted to the edge/cloud processing unit 12. Note that the concealed dictionary matrix may also be denoted herein as "D^".

In other words, in the pre-preparation, the local processing unit 11 performs a dictionary matrix transformation procedure in which the dictionary matrix D, which has been provided in advance or obtained from training using observed signals, is subjected to concealment processing by using a random unitary matrix $Q_p$, which is an M×M matrix generated by using a key p, to transform the dictionary matrix D to a concealed dictionary matrix D^, and the concealed dictionary matrix D^ is stored.

In execution of the concealment computation for sparse coding in FIG. 3, first, the local processing unit 11 transforms an observed signal y to a concealed observed signal,

[Math. 3-2]

$$\hat{y} \tag{3-2}$$

which is transmitted to the cloud. Note that the concealed observed signal may also be denoted herein as "y^".

In other words, in the execution of the concealment computation for sparse coding, the local processing unit 11 performs an observed signal transformation procedure in which the observed signal vector y is subjected to concealment processing by using the random unitary matrix $Q_p$ to transform the observed signal vector y to the concealed observed signal y^.

Then, the edge/cloud processing unit 12 executes an OMP algorithm using the concealed dictionary matrix D^ and the concealed observed signal y^, which have been transferred in advance, to estimate sparse coefficients. In other words, in the execution of the concealment computation for sparse coding, the edge/cloud processing unit 12 performs a computation procedure in which an optimization problem of Math. C1 is solved using Orthogonal Matching Pursuit by using the concealed observed signal y^ and the stored concealed dictionary matrix D^, to determine sparse coefficients x^ that approximates the sparse coefficients x.

Note that the edge/cloud processing unit 12 may perform post processing. Post processing is an application-specific necessary process performed by using the estimated sparse coefficients, examples of which include processing of media signals such as image/acoustic signals, analysis of biological signals such as brain waves, brain blood flow, or fMRI, and machine learning.

3. Concealment Computation Method for Orthogonal Matching Pursuit (OMP) Orthogonal Matching Pursuit (OMP)

For a given observed signal y and dictionary D, a problem of finding coefficients x which gives Dx approximating y is called a sparse coding problem (in a narrow sense). Here, the optimization problem of Expression (2) is considered as a problem of approximating the signal with a linear combination of as few bases as possible without reconstruction error exceeding a certain threshold.

[Math. 4]

$$x = \underset{x}{\mathrm{argmin}} \, \|y - Dx\|_2^2 \; \text{subject to} \; \|x\|_0 < \epsilon \tag{4}$$

where, ε is a desired value of the difference between the product of the dictionary matrix D and the sparse coefficients x, and the sample signal y.

To solve this problem, a number of algorithms have been proposed, such as a method based on a greedy algorithm and a method using relaxation from $l_0$ norm constraints to $l_1$ norm constraints.

The present disclosure proposes concealment computation for Orthogonal Matching Pursuit (OMP), which is widely used as a selection algorithm for sparse coefficients. The Orthogonal Matching Pursuit is an algorithm that finds a "support" S, which is an index set of non-zero coefficients, from an index set of coefficients to be utilized to approximate the observed signal. Initially, the support is set as an empty set, then a basis is newly added to the support set one by one so as to minimize the residual error of approximation of the observed signal y by a linear combination of the bases, and if the residual error of the approximation of the signal only by the bases included in the support is equal to or less than, the algorithm is stopped. This algorithm is a greedy algorithm in which bases that contribute to reduction of the residual error is selected one by one, and does not ensure optimality of the solution. However, this algorithm is known to give excellent approximation in the majority of cases.

Figure 6:
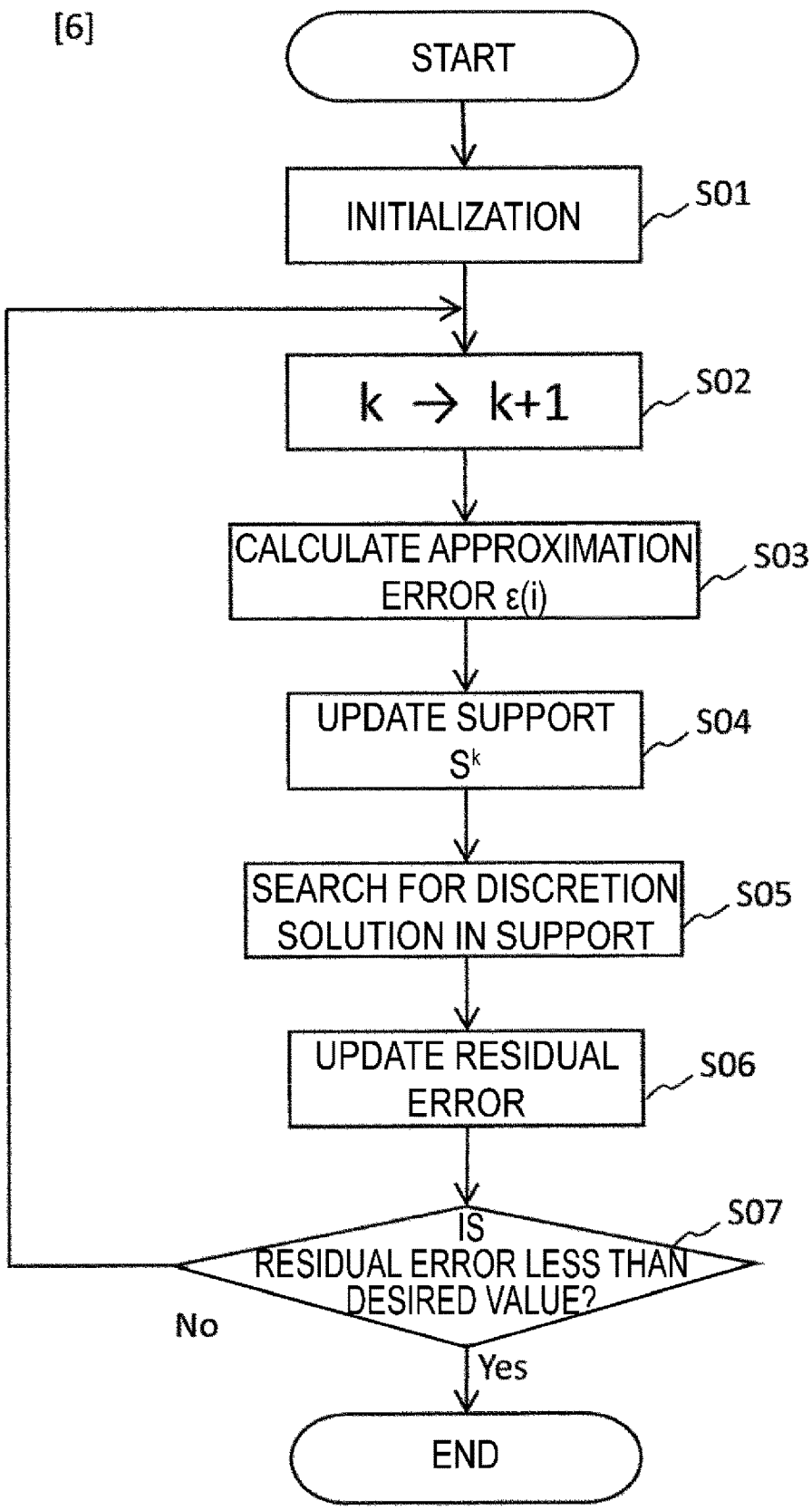
FIG. 6 is a flowchart for explaining the concealment computation method for sparse coding according to the embodiment of the present disclosure.

FIG. 6 is a diagram for explaining a computation algorithm for the Orthogonal Matching Pursuit. The computation algorithm includes an initialization step S01 and a main loop (steps S02 to S07).

Step S01

Parameters are initialized.

[Math. 4-1]

Initialization: $k = 0$ (4-1)

Initial solution $x^0 = 0$

Initial residual error $r^0 = y - Dx^0 = y$

Initial support of solution $S^0 = \emptyset$

Here, k will be described. In the sparse coding, the observed signal y is approximated by a linear combination of bases $d_i$, as represented in Equation (1). In the OMP algorithm, bases selected from K bases $d_i$ (i=1, 2, . . . , K) are added one by one to the support S in an order starting from a basis which gives best approximation. The variable denoting the number of bases in this context is "k".

For example, k=1 means that a single basis is used to express the observed signal y, where $d_i$ may be $d_1$ or may be $d_3$. In addition, k=2 means that two bases are used to express the observed signal y, where $d_i$ may be $d_1$ and $d_5$ or may be $d_1$ and $d_3$.

Step S01 is a step for initialization, and thus k is set to 0, the sparse coefficient x is set to a zero vector, a residual error r is set to the observed signal y, and the support S is set to an empty set.

Step S02 k is set to k+1.

Step S03

The error when adding the k-th basis $d_i$ to the support S is calculated.

[Math. 5]

$$\epsilon(i) = \min_{x_s}\|x_i d_i - r^{k-1}\|_2^2 = \|r^{k-1}\|_2^2 - \frac{(d_i \cdot r^{k-1})^2}{\|d_i\|_2^2} \tag{5}$$

Step S04

The support S is updated.

[Math. 6]

$$i_0 = \underset{e \notin S^{k-1}}{\operatorname{argmin}}\{\epsilon(i)\}, \; S^k = S^{k-1} U\{i_0\} \tag{6}$$

Step S05

Search for the best solution x-k in the support S is performed.

[Math. 7]

$$\bar{x}^k = \underset{x_{s^k}}{\operatorname{argmin}}\|y - D_{S^k} x_{S^k}\|_2^2 = (D_{S^i}^* D_{S^k})^{-1}(D_{S^k}^* y) \tag{7}$$

Step S06

The residual error r is updated.

[Math. 8]

$$r^k = y - D_{S^k}\bar{x}^k \tag{8}$$

Step S07

The algorithm checks whether the updated residual error r is less than the desired value ε.

[Math. 9]

$$\|r^k\|_2 < \epsilon \tag{9}$$

If the updated residual error r is less than the desired value, the result of the search in step S05 is set as the solution.

To facilitate subsequent analysis, the basis vector $d_i$ is defined as follows,

[Math. 10]

$$d_i = D\delta_i \tag{10}$$

where, $\delta_i$ is the following column vector,

[Math. 10-1]

$$\delta_i = [(0, \ldots, 0, \delta(i), 0, \ldots, 0)]^T \tag{10-1}$$

where i-th element is 1 and the other elements are zero. The approximation error of Equation (5) is expressed as follows using $\delta_i$.

[Math. 5A]

$$\epsilon(i) = \min_{x_s}\|x_i D\delta_i r^{k-1}\|_2^2 = \|r^{k-1}\|_2^2 - \frac{(D\delta_i \cdot r^{k-1})^2}{\|D\delta_i\|_2^2} \tag{5A}$$

A random unitary matrix will be explained before describing the concealment computation for Orthogonal Matching Pursuit (OMP) using a random unitary matrix according to the present disclosure.

Random Unitary Matrix

Basic properties of the concealment computation using a random unitary matrix will be described. In previous studies, template protection using random unitary transformation has been studied as a method for cancelable biometrics. Typically, in the concealment computation using a random unitary matrix, transformation T(·) is performed using the random unitary matrix $Q_p$ generated using the key p to transform an N-dimensional signal $f_z$ (z=1, ..., L) to the following N-dimensional concealed signal.

[Math. 11]

$$\hat{f}_z = T(f_z, p) = Q_p f_z \tag{11}$$

Note that the concealed signal may also be denoted herein as "$f_z\hat{\;}$".

$Q_p$ is an N×N matrix,

[Math. 11-1]

$$Q_p \in \mathbb{C}^{N \times N} \tag{11-1}$$

and satisfies the following equation,

[Math. 12]

$$Q_p^* Q_p = I \tag{12}$$

where [·]* represents Hermitian transpose and I represents an identity matrix. N is any natural number, and in the present embodiment, N=M. "L" is the number of signals (the number of samples). For example, in the case of audio signals, z corresponds to time, and signals $f_z$ (having N elements) are L sample signals for time z=1 to L (there are L signals $f_z$ having N elements). In the case of images, for example, z can be defined as an index of each image, and there are L image signals from $f_1$ to $f_L$. Alternatively, a single image may be divided into small blocks and the small blocks may be indexed.

Regarding generation of the random unitary matrix $Q_p$, use of Gram-Schmidt orthogonalization, and a method in which $Q_p$ is generated by combining a plurality of unitary matrices have been studied. Vectors a and b, which are two observed signals $f_z$ and $f_w$, and vector a^ and b^ obtained as a result of transformation using the random unitary matrix $Q_p$ satisfy the following relationship.

Property 1: Preservation of Euclidean Distance

[Math. 13]

$$\|a - b\|_2^2 = \|\hat{a} - \hat{b}\|_2^2 \tag{13}$$

Property 2: Preservation of Inner Product

[Math. 14]

$$a*b = \hat{a}*\hat{b} \quad (14)$$

Property 3: Preservation of Correlation Coefficient

[Math. 15]

$$\frac{ab}{\sqrt{ab}\sqrt{ab}} = \frac{\hat{a}\hat{b}}{\sqrt{\hat{a}\hat{b}}\sqrt{\hat{a}\hat{b}}} \quad (15)$$

Property 4: Norm Invariance

[Math. 15-1]

$$\|Q_p a\|_2^2 = \|a\|_2^2, \quad \|Q_p b\|_2^2 = \|b\|_2^2 \quad (15\text{-}1)$$

Concealment Computation for Orthogonal Matching Pursuit (OMP)

In the concealment computation for sparse coding according to the present embodiment, the concealed observed signal y^ and the concealed dictionary matrix D^ are generated as follows.

[Math. 16]

$$\hat{y} = T(y,p) = Q_p y \quad (16)$$

[Math. 17]

$$\hat{D} = T(D,p) = Q_p D \quad (17)$$

For a given y^ and D^, an optimization problem of the following equation is considered, instead of Equation (4):

[Math. 18]

$$\hat{x} = \underset{x}{\operatorname{argmin}} \|\hat{y} - \hat{D}x\|_2^2 \text{ subject to } \|x\|_0 < \epsilon \quad (18)$$

By solving the equation using the Orthogonal Matching Pursuit, the sparse coefficients

[Math. 18-1]

$$\hat{x} \quad (18\text{-}1)$$

can be obtained. Note that the sparse coefficient of the Expression (18-1) may also be denoted herein as "x^".

Here, proof that the sparse coefficients x^ are identical to the sparse coefficients x obtained from the unconcealed observed signal y and the unconcealed dictionary matrix D will be described. The concealment computation algorithm of Orthogonal Matching Pursuit is as shown in FIG. 6.

Step S01

Parameters are initialized.

[Math. 18-2]

$$\begin{aligned}&\text{Initialization:} \quad (18\text{-}2)\\&k = 0\\&\text{Initial solution } x^0 = 0\\&\text{Initial residual error } \hat{r}^0 = \hat{y} - \hat{D}x^0 = \hat{y} = Q_p y\\&\text{Initial support of solution } S^0 = \emptyset\end{aligned}$$

[Math. 18-2]

Step S01 is a step for initialization, and thus k is set to 0, the sparse coefficient x is set to a zero vector, a residual error r^ is set to the concealed observed signal y^, and the support S is set to an empty set.

Step S02 k is set to k+1.

Step S03

The error when adding the k-th basis $d_i$ to the support S is calculated. Here, by replacing, in Equation (5A), the dictionary matrix D and the residual error $r^{k-1}$ with the concealed D^ and $r^{\wedge k-1}$, and using the relational equations (16) and (17), the approximation error can be expressed by the following equation,

[Math. 19]

[Math. 19] (19)

$$\begin{aligned}\hat{e}(i) &= \min_{\hat{x}_t}\|\hat{x}_k \hat{D}\delta_i - \hat{r}^{k-1}\|_2^2\\&= \|\hat{r}^{k-1}\|_2^2 - \frac{(\hat{D}\delta_i \cdot \hat{r}^{k-1})^2}{\|\hat{D}\delta_i\|^2}\\&= \|Q_p r^{k-1}\|_2^2 - \frac{(Q_p D\delta_i \cdot Q_p r^{k-1})^2}{\delta_i^* \hat{D}^* \hat{D}\delta_i}\end{aligned}$$

According to the above-described properties of random unitary matrix, norm is invariant and thus,

[Math. 19-1]

$$\|Q_p r^{k-1}\|_2^2 = \|r^{k-1}\|_2^2 \quad (19\text{-}1)$$

and by the preservation of inner product, the following relationship holds.

[Math. 19-2]

$$Q_P D\delta_i \cdot Q_P r^{k-1} = D\delta_i \cdot r^{k-1} \quad (19\text{-}2)$$

[Math. 19-3]

$$\hat{D}^*\hat{D} = D^*D \quad (19\text{-}3)$$

Thus, Equation (19) can be rewritten as follows.

[Math. 20]

$$\hat{\varepsilon}(i) = \|r^{k-1}\|_2^2 - \frac{(D\delta_i \cdot r^{k-1})^2}{\|D\delta_i\|_2^2} \quad (20)$$

Equation (20) is the same as Equation (5A). In other words, the approximation error $\hat{\varepsilon}(i)$ calculated using the concealed signals $\hat{y}$ and $\hat{D}$ is identical to the approximation error $\varepsilon(i)$ calculated using the original signals (y and D).

Step S04

The support S is updated. By $\hat{\varepsilon}(i)=\varepsilon(i)$, the following equation holds.

[Math. 21]

$$\begin{aligned} i_0 &= \underset{i \notin S^{k-1}}{\arg\min}\{\hat{\varepsilon}(i)\} \\ &= \underset{i \notin S^{k-1}}{\arg\min}\{\varepsilon(i)\}, \; S^k = S^{k-1} U\{i_0\} \end{aligned} \quad (21)$$

Step S05

Search for the best solution $x^{\wedge k}$ in the support S is performed.

[Math. 22]

$$E_2 = \|\hat{y} - \hat{D}_{S^k} x_{S^k}\|_2^2 \quad (22)$$

[Math. 22-1]

$$X_{S^k} \quad (22\text{-}1)$$

By solving minimization for Expression (22-1) included in Equation (22),

[Math. 22 – 2]

$$\frac{\partial E_2}{\partial x_{S^k}} = 0 \quad (22-2)$$

the following equation is given.

[Math. 23]

$$\begin{aligned} \hat{x}^k &= \underset{x_{S^k}}{\arg\min} \|\hat{y} - \hat{D}_{S^k} x_{S^k}\|_2^2 \\ &= (\hat{D}_{S^k}^* \hat{D}_{S^k})^{-1}((\hat{D}_{S^k}^* \hat{y})) \end{aligned} \quad (23)$$

By preservation of inner product of Equation (14), the following relationship holds.

[Math. 23–1]

$$\hat{D}_{S^k}^* \hat{D}_{S^k} = D_{S^k}^* D_{S^k} \quad (23-1)$$

$$\hat{D}_{S^k}^* \hat{y} = D_{S^k}^* y$$

and thus Equation (23) can be rewritten as follows.

[Math. 24]

$$\hat{x}^k = (D_{S^k}{}^* D_{S^k})^{-1}(D_{S^k}{}^* y) \quad (24)$$

Equation (24) is identical to Equation (7). In other words, the best solution $x^{\wedge k}$ in the support obtained using the concealed signals $\hat{y}$ and $\hat{D}$ is equal to the best solution $x^{-k}$ when the original signals (y and D) are used.

Step S06

The residual error $\hat{r}$ is updated. Replacing Equation (8) using the concealed signals results in the following equation.

[Math. 24-1]

$$\hat{r}^k = \hat{y} - \hat{D}_{S^k} \hat{x}^k$$

By the definitional Equations (16) and (17) and the best solution in support, $x^{\wedge k}=x^{-k}$, the following equation holds.

[Math. 25]

$$\hat{r}^k = Q_p(y - D_{S^k} \bar{x}^k) \quad (25)$$

Here, as Equation (8) holds, Equation (25) can be expressed as the following equation by using the error $r^k$ when using the original signal.

[Math. 25-1]

$$\hat{r}^k = Q_p r^k \quad (25\text{-}1)$$

Step S07

The algorithm checks whether the updated residual error $\hat{r}$ is less than the desired value $\varepsilon$.

[Math. 25-2]

$$\|\hat{r}^k\|_2 < \varepsilon \quad (25\text{-}2)$$

The algorithm terminates if Equation (25-2) is satisfied. By Equation (25-1) and the property of norm invariance, the following relationship holds.

[Math. 26]

$$\begin{aligned} \|\hat{r}^k\|_2 &= \|Q_p r\|_2 \\ &= \|r^k\|_2 < \varepsilon \end{aligned} \quad (26)$$

That is, a stopping rule for the concealed signals $\hat{y}$ and $\hat{D}$ is the same as a stopping rule for the original signals (y and D).

As described above, the sparse coefficients $x^{\wedge}$ calculated using the concealed signals, is proven to be equal to the sparse coefficients x calculated using the original signals.

Figure 4:
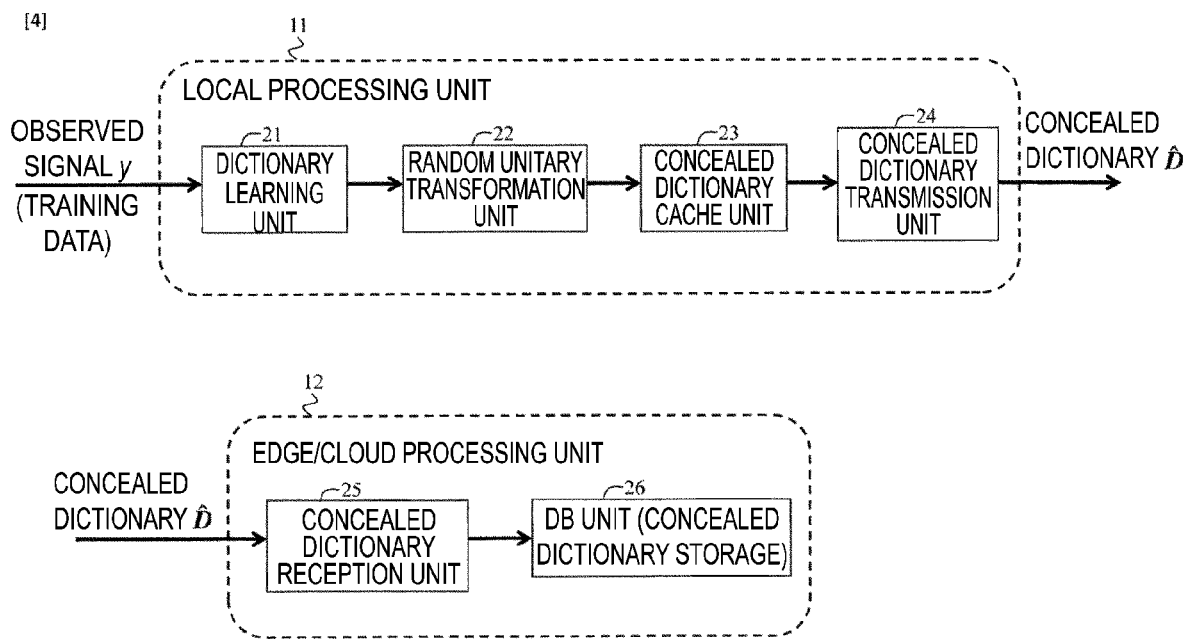
FIG. 4 is a diagram for explaining a concealment computation apparatus for sparse coding according to the embodiment of the present disclosure.
Figure 5:
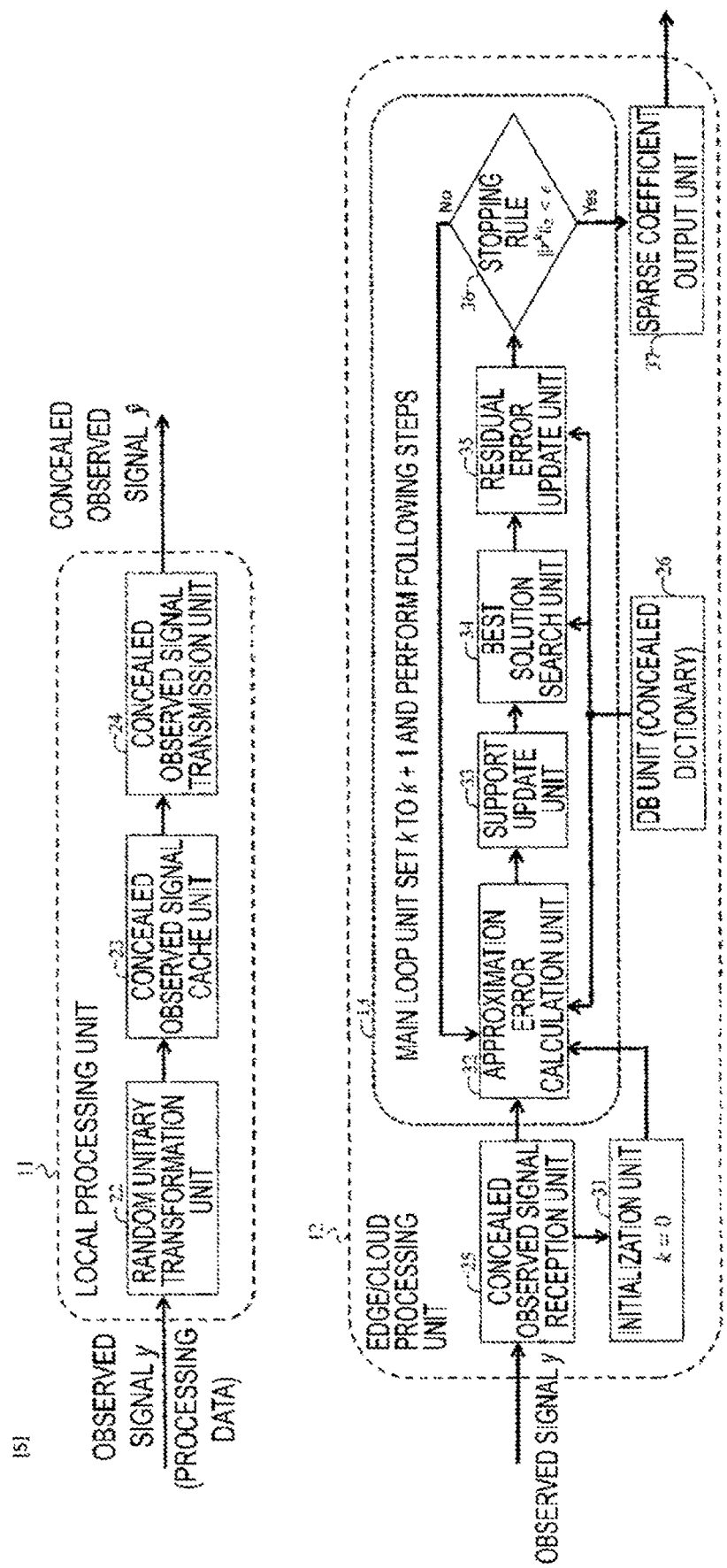
FIG. 5 is a diagram for explaining the concealment computation apparatus for sparse coding according to the embodiment of the present disclosure.

4. Specific Configuration of System for Concealment Computation for Sparse Coding FIGS. 4 and 5 are specific configuration diagrams for explaining a system for concealment computation for sparse coding. The system for concealment computation for sparse coding includes the local processing unit 11 and the edge/cloud processing unit 12.

FIG. 4 is a diagram of when the above-described dictionary matrix transformation procedure is performed.

The local processing unit 11 includes a dictionary learning unit 21, a random unitary transformation unit 22, a cache unit 23, and a transmission unit 24. The dictionary learning unit 21 receives the observed signal y for training, and performs learning using a K-SVD method or the like to generate the dictionary matrix D. Note that, if the dictionary matrix D is provided in advance, the dictionary learning unit 21 is not required. The random unitary transformation unit 22 transforms the dictionary matrix D to the concealed dictionary matrix D^ by subjecting the dictionary matrix D to concealment processing by using the random unitary matrix $Q_P$, which is an M×M matrix generated using the key p. The cache unit 23 temporarily stores the concealed dictionary matrix D^ generated by the random unitary transformation unit 22. The transmission unit 24 transmits the concealed dictionary matrix D^ to the edge/cloud processing unit 12.

The edge/cloud processing unit 12 includes a reception unit 25 and a database unit 26. The transmission unit 25 receives the concealed dictionary matrix D^ that has been transmitted from the local processing unit 11. The database unit 26 stores the concealed dictionary matrix D^.

FIG. 5 is a diagram of when the observed signal transformation procedure and the computation procedure, which are described above, are performed.

In these procedures, the dictionary learning unit 21 is not required in the local processing unit 11. The random unitary transformation unit 22 transforms the observed signal vector y to the concealed observed signal y^ by subjecting the observed signal vector y to concealment processing by using the random unitary matrix $Q_P$. The cache unit 23 temporarily stores the concealed observed signal y^ generated by the random unitary transformation unit 22. The transmission unit 24 transmits the concealed observed signal y^ to the edge/cloud processing unit 12.

In addition to the reception unit 25 and the database unit 26, the edge/cloud processing unit 12 includes a main loop unit 13, an initialization unit 31, and a sparse coefficient output unit 37. The transmission unit 25 receives the concealed observed signal y^ that has been transmitted from the local processing unit 11. When the transmission unit 25 receives the concealed observed signal y^ for the first time, the transmission unit 25 transfers the concealed observed signal y^ to the initialization unit 31, and causes the initialization unit 31 to perform the step S01 of the concealment computation algorithm for Orthogonal Matching Pursuit of FIG. 6. Thereafter, the transmission unit 25 transfers the received concealed observed signal y^ to the main loop unit 13.

The main loop unit 13 calculates the sparse coefficient x^ using the concealed observed signal y^ and the concealed dictionary matrix D^ stored in the database unit 26. The main loop unit 13 includes an approximation error calculation unit 32, a support update unit 33, a best solution search unit 34, a residual error update unit 35, and a computation stop unit 36.

The approximation error calculation unit 32 calculates the approximation error ε^(i) (step S03 in FIG. 6) by using the concealed dictionary matrix D^ stored in the database unit 26, and the concealed observed signal y^ (initialized residual error), the initial solution $x^0$, and the initial support $S^0$ of the solution, or the concealed observed signal y^, the solution $x^{k-1}$, the residual error $r^{k-1}$, the support $S^{k-1}$ of the solution calculated immediately before. The support update unit 33 updates the support S using the approximation error ε^(i) calculated by the approximation error calculation unit 32 (step S04 in FIG. 6).

The best solution search unit 34 searches for the best solution $x^{\wedge k}$ in the support S using the support S updated by the support update unit 33 and the concealed dictionary matrix D^ stored in the database unit 26 (step S05 in FIG. 6). The residual error update unit 35 updates the residual error $r^{\wedge k}$ using the best solution $x^{\wedge k}$ determined by the best solution search unit 34 and the concealed dictionary matrix D^ stored in the database unit 26 (step S06 in FIG. 6). The computation stop unit 36 determines whether the residual error $r^{\wedge k}$ updated by the residual error update unit 35 is less than the desired value ε. If the residual error $r^{\wedge k}$ is less than the desired value ε, the computation stop unit 36 causes the sparse coefficient output unit 37 to output the best solution $x^{\wedge k}$ determined by the best solution search unit 34. On the other hand, If the residual error $r^{\wedge k}$ is not less than the target value ε, the computation stop unit 36 passes the residual error $r^{\wedge k}$ and the best solution $x^{\wedge k}$ to the approximation error calculation unit 32, for re-calculation.

That is, the concealment computation method for sparse coding described in the present embodiment is a calculation method of approximation of the sparse coefficient x by using the concealed observed signal y^ obtained by subjecting the observed signal y to concealment processing by using the random unitary matrix Qp, and the concealed dictionary matrix D^ obtained by subjecting the dictionary matrix D to concealment processing by using Qp, to solve the optimization problem by Orthogonal Matching Pursuit (OMP).

5. Effects of the Present Concealment Computation Method

With the concealment computation method for sparse coding described in the present embodiment, it is possible to perform sparse coding by utilizing edge/cloud computational resources while protecting privacy. The concealment computation method for sparse coding described in the present embodiment can estimate sparse coefficients by using observed signals and a dictionary matrix which are concealed for privacy protection, and can be used with widely used applications.

Second Embodiment

The present embodiment is an image recognition system achieved by applying the concealment computation method for sparse coding described in the first embodiment, to image recognition, in particular to facial image recognition for identifying the face of a person.

Figure 7:
FIG. 7 is a diagram for explaining an image recognition technology.
Figure 8:
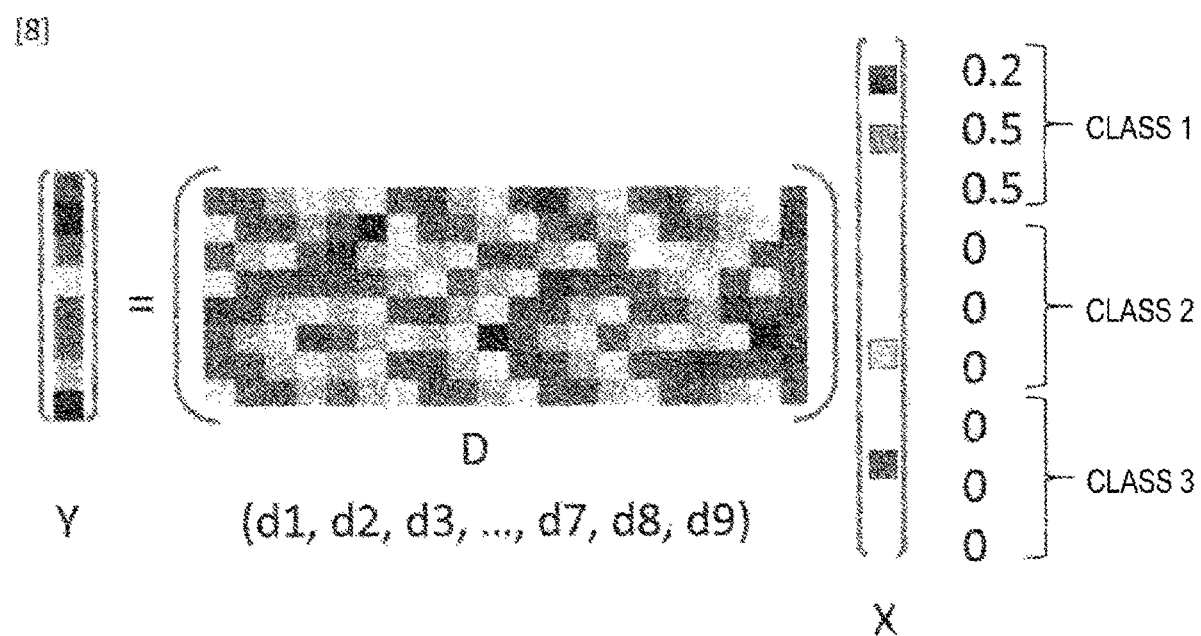
FIG. 8 is a diagram for explaining the image recognition technology.
Figure 9:
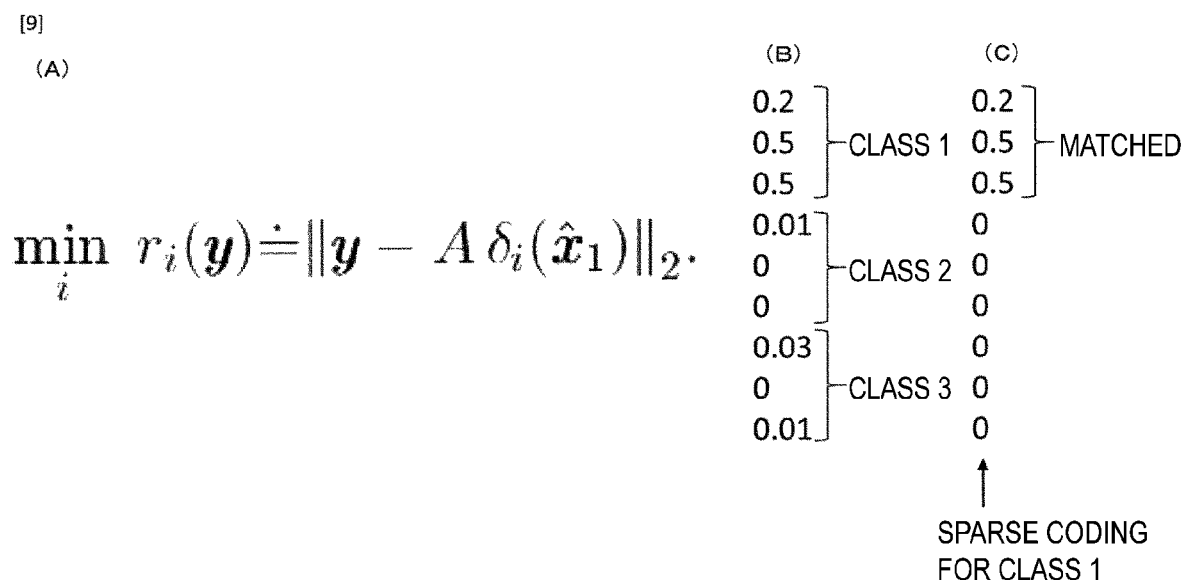
FIG. 9 is a diagram for explaining the image recognition technology.

A face image recognition technology that uses sparse coding to classify facial images is disclosed in, for example, NPL 2. FIGS. 7 to 9 are diagrams for explaining the face image recognition technology disclosed in NPL 2. As seen from FIG. 7, for the same class (person), there are a plurality of low dimension (low resolution) images different from each other in lighting, face orientation, or the like. Any one of the images is represented by superimposing a plurality of the other images of the same class (person). For example, as illustrated in FIG. 8, a test sample belonging to any one of the classes (observed signal vector) Y can be represented as Y=DX, where a dictionary D is a matrix having, as its elements, nine bases di (i=1 to 9) which are column vectors (three classes and three sample images for each class), and X is a sparse coefficient.

An equation shown in FIG. 9(A) is a calculation equation used to classify a test sample Y ("y" in the equation). First, a dictionary of class i is utilized to calculate a reconstruction error with respect to the test sample Y (FIG. 9(B)). A test sample that does not match with the dictionary gives a larger reconstruction error. Thus, reconstruction errors between the test sample Y and all classes i are calculated and the class which gives the smallest reconstruction error (the class of sparse coding that is closest to the calculated reconstruction error) is determined as a class to which the test sample Y belongs.

[1] System Model

Figure 10:
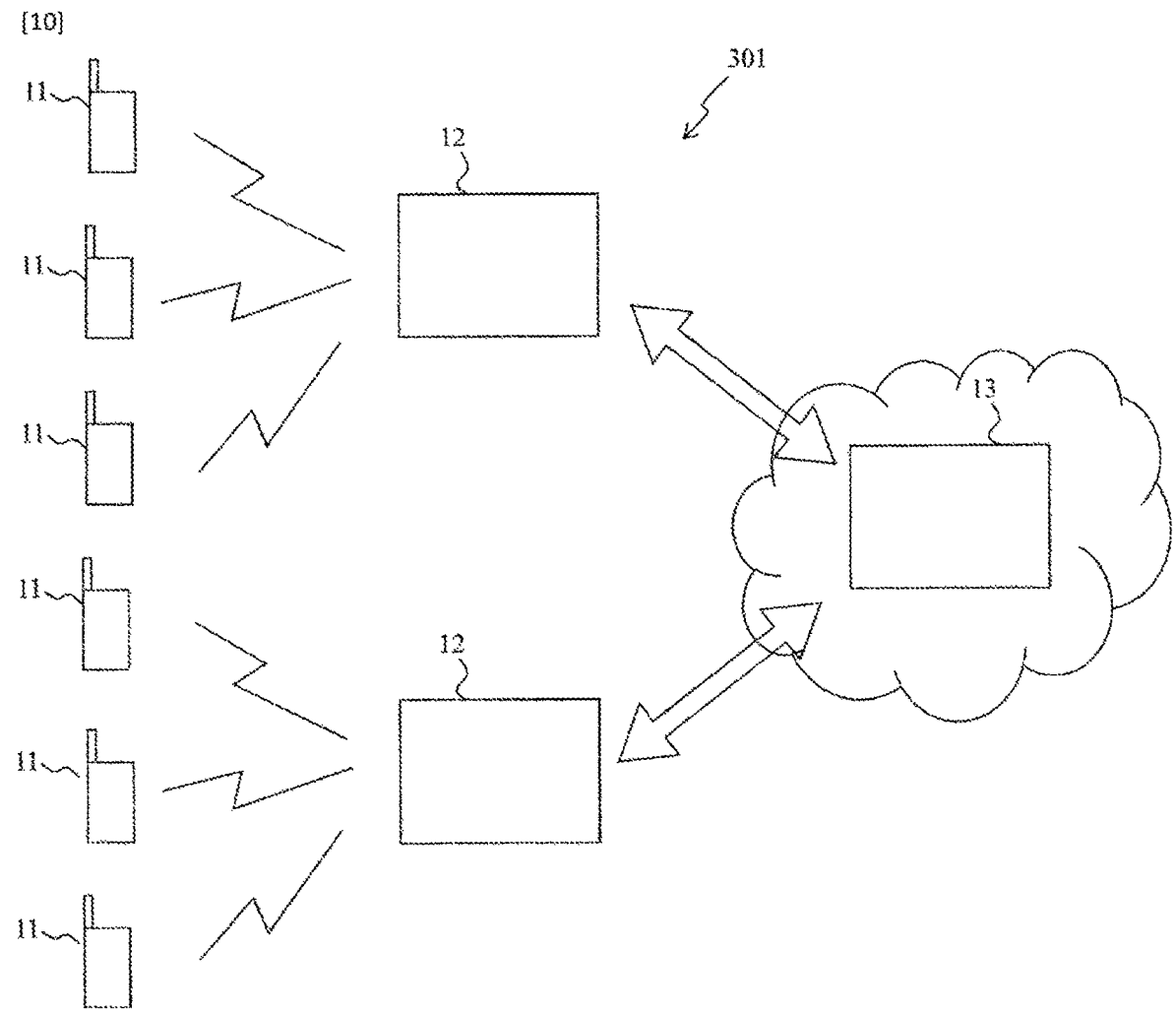
FIG. 10 is a diagram for explaining an image recognition system according to an embodiment of the present disclosure.

In this section, architecture of a system using edges and a cloud will be described first. FIG. 10 is a diagram for explaining an image recognition system 301 according to the present embodiment. The image recognition system 301 is an image recognition system that includes N terminals 111 (N is an integer not less than 2), M transfer servers 112 (M is an integer not less than 1), and an image recognition server 113.

An image $y_i^j$ is assumed to be expressed, by using a dictionary matrix $D_i^j$ being an M×K matrix having, as elements thereof, K (K>M) bases, and a sparse coefficient $X_i^j$ being a K-dimensional vector, as $y_i^j = D_i^j \cdot X_i^j$, where i is a class to which an image to be identified belongs, and j and k (k∈j) are numbers of terminals 111.

The terminal 111 encrypts a testing image using a random unitary matrix Qp generated by using a key p, to generate an encrypted testing image, and transfer the encrypted testing image to a specified one of the transfer servers 112.

The transfer server 112 downsamples the encrypted testing image, transform the encrypted testing image to a one-dimensional encrypted image vector, and transfer the encrypted image vector to the image recognition server 113. The image recognition server 113 uses a plurality of encrypted dictionaries generated by encrypting, by using the random unitary matrix Qp, a plurality of dictionaries generated using different training images, to solve, by Orthogonal Matching Pursuit, an optimization problem represented by Math. C1 for each of the plurality of encrypted dictionaries, to estimate a class, to which the encrypted image vector belongs, for each of the plurality of the encrypted dictionaries, and performs ensemble learning on the classes estimated for each of the plurality of the encrypted dictionaries to determine a single class to which the encrypted image vector belongs.

$$\tilde{X}^{(j,k)} = \arg\min_{x^j} \left\| \overline{D}^j X^j - \overline{y}^k \right\|_2 \text{ s.t. } \|X^j\|_0 \leq \epsilon \quad \text{(C1a)}$$

where, $\overline{D}^j$ is the encrypted dictionary of a terminal of number j, $X^j$ is a sparse coefficient of the terminal 111 of number j, and $\overline{y}^k$ is the encrypted image vector generated by downsampling the encrypted testing image from the terminal 111 of number k (k∈j) and transforming the encrypted testing image to a one-dimensional vector.

[Math. C1a]

First, a method for facial recognition based on a sparse representation will be described, and an optimization problem under privacy constraints (encrypted state) is formulated. Note that in the following description, "terminal" may be referred to as "device", "transfer server" may be referred to as "edge server", and "image recognition server" may be referred to as "cloud."

A. Edge and Cloud System

In the system 301, the N mobile devices 111 are connected to the single remote cloud server 113 via the M edge servers 112. The mobile device 111 executes an application that includes facial recognition, such as an interactive game or a virtual reality application.

Each mobile device j has $B_i^j$ training samples for class i, which is one of L classes of people denoted by "L" (see NPL 2). Each of the edge servers 112 is a lightweight computing at a wireless access point. On the other hand, the remote cloud 113 has a more powerful processor and is connected with the edge servers 112 using a backbone network.

In computing utilizing edges and a cloud, the mobile device 111 offloads its computing tasks onto an edge server 112 that is proximate via the wireless channel. Instead of the mobile device 111, the edge server 112 performs computational tasks, along with the cloud server 113.

B. Sparse Representation of Facial Image

Facial recognition is to determine a class to which a new test sample belong, using labeled training samples for L different classes (face images of L persons). In the present embodiment, a subspace model defined in NPL 2 is used and the definition is as follows.

Definition 1 (Facial Subspace Model)

The following definitions are provided.

[Math. 2-0]

$$B_i^j, \ \in \mathcal{L}, j \in \mathcal{N}. \quad (2\text{-}0)$$

(L is the number of classes (the number of people), and $\mathcal{N}$ is the number of devices)

$$d_{(i,n)}^j \in R^{m \times i}, n \in \{1, 2, \ldots, b_{ij}\}$$

$$D_i^j = [d_{(i,1)}^j, d_{(i,2)}^j, \ldots, d_{(i,b)}^j] \in R^{m \times b_i^j}$$

$$y_i^j \in R^{m \times i}$$

The training sample $B_i^j$ can be expressed as the sum of b column vectors $d_{(i,n)}^j$ (more correctly, for the device j of the class i (the i-th person), a weighted linear sum of the b column vectors). The dictionary $D_i^j$ can be formulated as represented in Math. 2-0. Almost all of the test samples from the same class $y_i^j$ which can be represented by Math. 2-1, are in a subspace having a range of the $B_i^j$.

[Math. 2-1]

$$y_i^j = D_i^j X_i^j$$

$$X_i^j = \left[ x_{(i,1)}^j, x_{(i,2)}^j, \ldots, x_{(i,b_i^j)}^j \right]^T \in R^{b_i^j \times 1}$$

where, $X_i^j$ is a weight of each element.

—Definition 1 End—

Note that the term "subspace" refers to a space represented by a linear weighted sum based on the dictionary $D_i^j$ represented in Expressions (2-0) and the corresponding coefficients $X_i^j$. In other words, a "subspace" is a space defined by Equation (1), which expresses the device j of the class i (the i-th person).

The dictionary $D^j$ of the device j is defined as follows.

[Math. 2-2]

$$D^j = [D_1^j, D_2^j, \ldots, D_L^j]. \quad (2)(2\text{-}2)$$

According to definition 1, any testing image y can be sparsely represented on the dictionary $D^j$.

[Math. 2-3]

$$y^j = D^j X^j, \quad (3)$$

$$X^j = [X_1^j; X_2^j; \ldots; X_L^j] \in \mathbb{R}^{\Sigma_l b_l^j \times 1} \quad (2-3)$$

where $X^j$ is the sparse coefficients.

[Math. 2-3a]

$$\sum_{k \in \mathcal{L}} b_i^j > m \quad (2\text{-}3a)$$

If Math. 2-3a holds and $D^j$ is an overcomplete matrix, the solution of Equation (2-3) cannot be determined uniquely. This problem can be solved by solving the following $l_0$ minimization problem.

[Math. 2-4]

$$(P_0) \hat{X}^j = \arg\min_{X^j} \|D^j X^j - y^j\|_2 \;\; s.t. \;\; \|X^j\|_0 \le \epsilon, \quad (2-4)$$

where $\epsilon$ represents sparsity constraint (desired value of error). The above optimization problem can be solved efficiently by using Orthogonal Matching Pursuit (OMP).

C. Formulation of the Problem

When the sample data $y^j$ and $j \in N$ are given, the sparse coefficients $X^{\sim j}$ is calculated using Math. 2-4. Ideally, if the elements of $X^{\sim j}$ are non-zero, it is associated with a dictionary $D^j$ column of one class. For example, if the following specification is provided,

[Math. 2-4a]

$$\hat{X}_i^j = 0, \forall j \ne i. \quad (2\text{-}4a)$$

$y^j$ can be substituted into the class i. However, due to noise and modeling errors, there is a non-zero small entry associated with another class. To address this problem, the following definition is used.

[Math. 2-4b]

$$\delta_l^j = [0, \ldots, 0, 1, \ldots, 1, 0, \ldots, 0], j \in \mathcal{N}, l \in \mathcal{L} \quad (2\text{-}1b)$$

The non-zero entries do not only correspond to the entries of $X^j$, but it only relates to the l-th class. The test sample $y^j$ can be approximated by Math. 2-4c by using only the coefficients corresponding to the l-th class, and $y^j$ can be classified according to the optimization problem of Math. 2-5.

[Math. 2-4c]

$$D^j \delta_l^j \hat{X}^j; \quad (2\text{-}4c)$$

[Math. 2-5]

$$(P_1) \min_l r_l^j(y^j) = \|y^j - D^j \delta_l^j \hat{X}^j\|_2^2 \quad (2-5)$$

where, $n_l^j(y^j)$ represents the approximation error specific to each class.

NPL 2 states that such a method is effective in facial recognition. However, this classification is performed based only on a dictionary of each device, and is thus vulnerable to noise and modeling errors.

An object of the present invention is to construct a framework for minimizing reconstruction errors by utilizing multi-device diversity while ensuring security in an edge and cloud system, as described above. This can be formally formulated as follows.

[Math. 2-6]

$$(P_2) \min_{l,j} \bar{r}_l^j(\bar{y}^k) = \|\bar{y}^k - \bar{D}^j \delta_l^j \bar{X}^{(j,k)}\|_2^2 \quad (2-6)$$

$$s.t. \;\; \bar{y}^k = f(p, y^k)$$

$$\bar{D}^j = f(p, D^j)$$

$$r_l^j(y^k) = \bar{r}_l^j(\bar{y}^k),$$

Where $f(\cdot)$ is an encryption function, p is a key for encryption, $$\hat{X}^{(j,k)}, j, k \in \mathcal{N}$$

represents sparse coefficients of $y^k$ in $D_j$.

At Math. 2-6, the first equation means a framework for minimizing a reconstruction error, the second and third equations means ensuring security (encryption), and the fourth equation means that there is no difference in accuracy of computation between a plaintext region and an encrypted region.

[2] Safe Sparse Representation

This section describes a high security framework for sparse representation using edges and a cloud for facial recognition. Random unitary transformation that satisfies the privacy protection constraint of Equation (6) will be introduced and three important properties of the random unitary transformation will be described. Based on the properties, it will be described that the result of facial recognition is not affected by the random unitary transformation. Furthermore, a framework of ensemble learning to utilize multi-device diversity will be described. The sparse representation and related reconstruction errors are calculated according to each dictionary in the cloud, which serves as a member classifier. These member classifiers solve Equation (6) and inform a determiner of the results, to improve the accuracy of classification.

A. Random Unitary Transformation

Not only for achieving privacy protection in the system, but also for realizing algorithm operating for the encrypted region, the random unitary transformation is one of promising methods. The random unitary transformation has proven to be effective for biometric template protection and network BMI coding (see, e.g., NPL 3).

Any vector $v \in R^{m \times 1}$ encrypted by using a random unitary matrix $Q_p \in C^{m \times m}$ having a private key p can be expressed as follows:

[Math. 2-7]

$$\bar{v} = f(p, v) = Q_p v, \qquad (2\text{-}7)$$

where, $Q_p \in C^{m \times m}$, $v \in R^{m \times 1}$, $\bar{v}$ (which may also be denoted herein as v^) is an encrypted vector, and the unitary matrix Qp is defined as follows,

[Math. 2-8]

$$Q_p^* Q_p = I, \qquad (2\text{-}8)$$

where [·]* represents a Hermitian transpose matrix and I represents an identity matrix. Gram-Schmidt orthogonalization can be used to generate Qp. The encrypted vector has the following three properties:

Preservation of Euclidean Distance

[Math. 2-9]

$$\|v_i - v_j\|_2^2 = \|\bar{v}_i - \bar{v}_j\|_2^2,$$

Norm Invariance

[Math. 2-10]

$$\|v\|_2^2 = \|\bar{v}\|_2^2, \qquad (2\text{-}10)$$

Preservation of Inner Product

[Math. 2-11]

$$v_i \times v_j^T = \bar{v}_i \times \bar{v}_j^T. \qquad (2\text{-}11)$$

B. Safe Sparse Representation and Recognition
A Training Sample

[Math. 2-11a]

$$d_{(i,n)}^j \in R^{m \times 1}, i \in \mathcal{L}, j \in \mathcal{N}, n \in \{1, 2, \ldots, b_i^j\} \qquad (2\text{-}11a)$$

and a sample for testing

[Math. 2-11b]

$$y^j, j \in \mathcal{N} \qquad (2\text{-}11b)$$

are encrypted as follows by using the random unitary transformation.

[Math. 2-12]

$$\bar{d}_{(i,n)}^j = f(p, d_{(i,n)}^j) = Q_v d_{(i,n)}^j, \qquad (12)$$

-continued $$\bar{y}^j = f(p, y^j) = Q_p y^j. \qquad (2\text{-}12)$$

Figure 11:
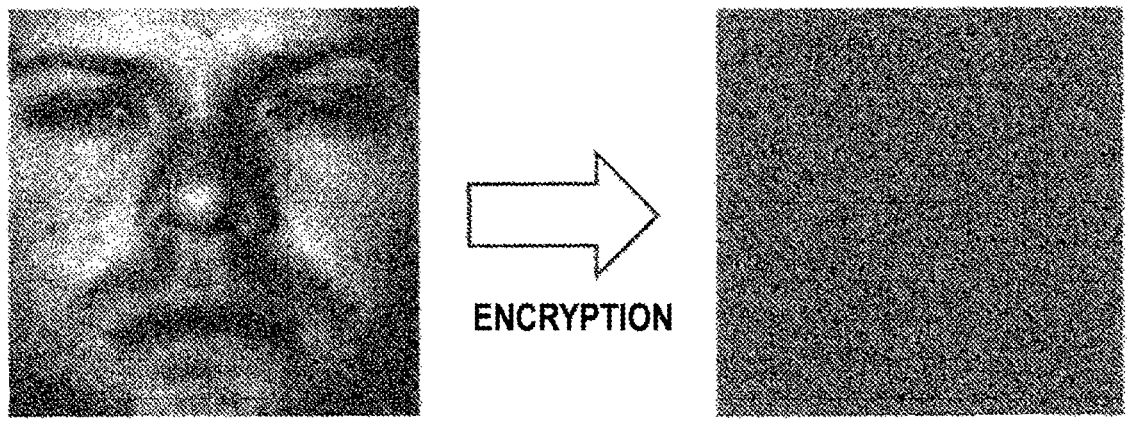
FIG. 11 is a diagram for explaining image encryption performed by the image recognition system according to the embodiment of the present disclosure.

Math. 12 means encrypting an image as shown in FIG. 11.
In addition, by Math. 2-2, the dictionary is encrypted as follows.

[Math. 2-13]

$$\bar{D}^j = f(p, D^j) = Q_p D^j, \text{ where,} \qquad (13)$$

$$\bar{D}^j, j \in \mathcal{N}. \qquad (2\text{-}13)$$

To obtain a safe sparse representation, an optimization problem for an encrypted region is formulated.

[Math. 2 – 14]

$$\hat{X}^{(j,k)} = \arg\min x_i \left\| \bar{D}^j X^j - y^k \right\|_2 \text{ s.t. } \|X^j\|_0 \leq \in \qquad (2\text{-}14)$$

Note that the solution $X^{\wedge(j, k)}$ of Math. 2-14 is equal to the solution $X^{(j, k)}$ of a case where no encryption is performed.
Here, regarding the following theorem, it will be proved that the encryption does not affect the result of the facial recognition.

[Theorem 1] The result (Math. 2-14a) of solving Math. 2-6 is the same as the result (Math. 2-14b) of solving Math. 2-15.

[Math. 2 – 14a]

$$\bar{r}_i^j(\bar{y}^k) \qquad (2\text{-}14a)$$

[Math. 2 – 14b]

$$r_i^j(y^k) \qquad (2\text{-}14b)$$

[Math. 2 – 15]

$$\min_{l,j} r_i^j(\bar{y}^k) = \left\| y^k - D^j \delta_l^j \hat{X}^{(j,k)} \right\|_2^2 \qquad (2\text{-}15)$$

Proof: When (Math. 2-14a) is observed to be usually small, Math. 2-16 is obtained.

[Math. 2 – 16]

$$\bar{r}_i^j(\bar{y}^k) = \|\bar{y}^k\|_2^2 - \frac{\bar{y}^k \left( \bar{D}^j \delta_l^j \hat{X}^{(j,k)} \right)^T}{\left\| \bar{D}^j \delta_l^j \hat{X}^{(j,k)} \right\|_2^2} \qquad (2\text{-}16)$$

By the properties of the unitary transformation, the following equations can be obtained.

[Math. 2–16a]

$$\|\bar{y}_k\|_2^2 = \|y_k\|_2^2 \,\forall\, j \in \mathcal{N} \text{ (norm invariance)} \qquad (2\text{-}16a)$$

$$\bar{y}_k \bar{D}_j \delta_l^j \hat{X}^{(j,k)} = y^k D^j \delta_L^j \hat{X}^{(j,k)}, \,\forall\, j \in N,$$

$l \in \mathcal{L}$ (preservation of inner product)

$$\bar{D}_j \delta_l^j \hat{X}^{(j,k)} = D^j \delta_l^j \hat{X}^{(j,k)}, \,\forall\, j \in N, l \in \Sigma\mathcal{L} \text{ (norm variance)}$$

Thus, Math. 2-16 can be transformed as follows.

[Math. 2 – 17]

$$\tilde{r}_i^j(\tilde{y}^k) = \|y^k\|_2^2 - \frac{y^k(D^j\delta_i^j\hat{X}^{(j,k)})^T}{\|D^j\delta_i^j\hat{X}^{(j,k)}\|_2^2} = \|y^k - D^j\delta_i^j\hat{X}^{(j,k)}\|_2^2 \quad (2-17)$$

This is the same as Math. 2-14b.

Figure 12:
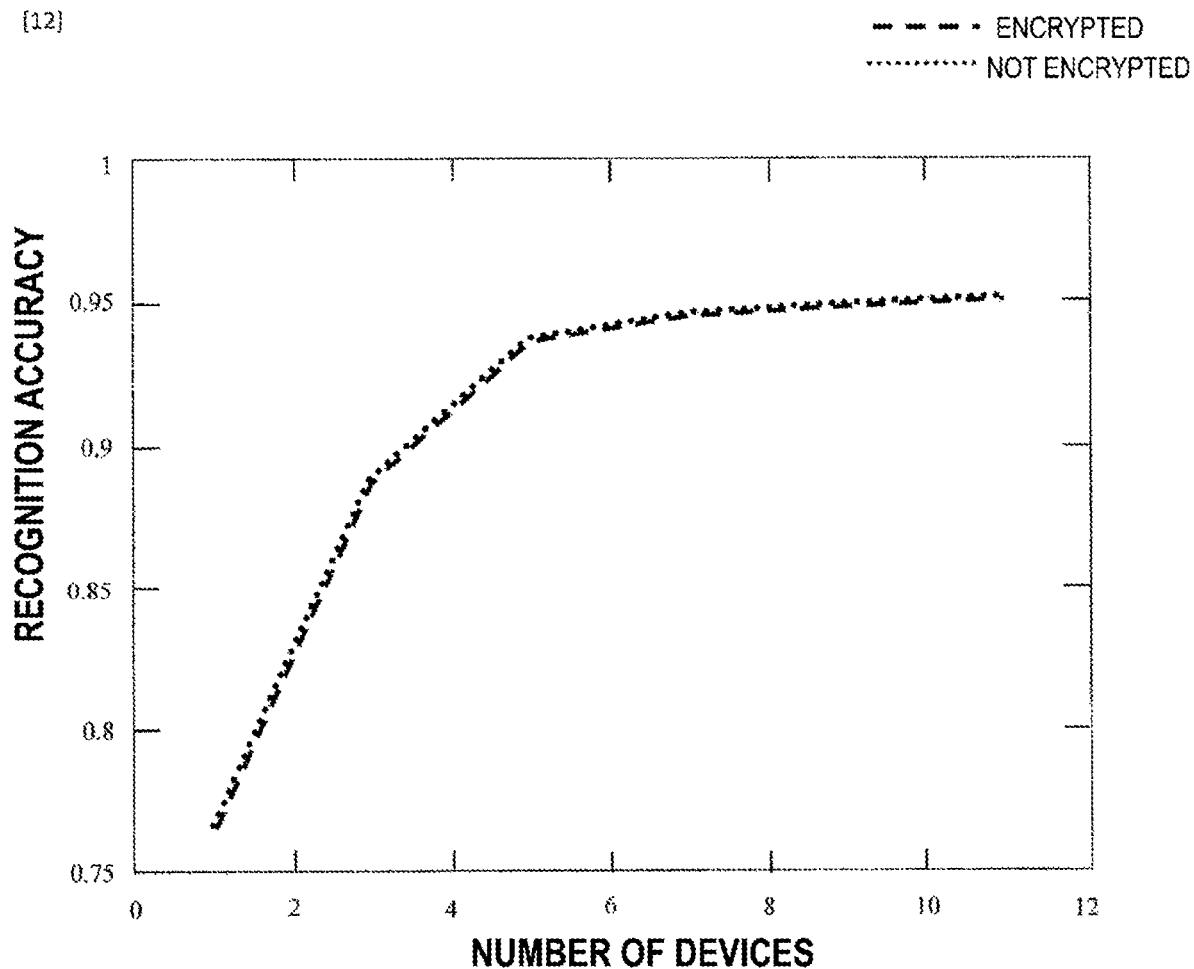
FIG. 12 is a diagram for comparison of facial recognition performance between when encryption is performed and when encryption is not performed.

FIG. 12 is a diagram for comparison of facial recognition performance between when encryption is performed and when encryption is not performed. The horizontal axis represents the number of devices and the vertical axis represents the accuracy of recognition (the closer to 1, the more accurate). Thus, it can be confirmed that there is no difference in the performance of the facial recognition between when the encryption is performed and when the encryption is not performed. Thus, it can be concluded that the algorithm according to the disclosure that uses the unitary random transform operates in an encrypted region without degrading performance.

C. Ensemble Learning Framework

The term, "ensemble learning" as used herein is learning that improves prediction capability for novel data by combining training results obtained individually using separate member classifiers. In a specific example of ensemble learning, the plurality of encrypted dictionaries DA are separately used to perform class estimation, and a class which gets the most estimation results may be determined as a final class (majority vote). Alternatively, the plurality of encrypted dictionaries DA may be separately used to solve the optimization problem of Math. 2-6 to determine the reconstruction error (Math. 2-18) of $y^{\wedge k}$, and a class which gives the smallest value for Math. 2-6 may be found among classes estimated by separately using the plurality of encrypted dictionaries $D^{\wedge j}$, to be determined as the final class.

[Math. 2-18]

$$r_i^j(\tilde{y}^k) \quad (2\text{-}18)$$

The ensemble learning framework includes algorithm 1 of FIG. 13 including a dictionary learning stage and a recognition stage. In step 2 of the algorithm 1, n in the training images $d_{(j,n)}{}^j$ has the following meaning. Training images of device j of the class i (the i-th person) are expressed by a weighted linear sum of $b_i^j$ column vectors, and, in this expression, n represents any element of the column vectors (n=1, 2, . . . , $b_i^j$). Specifically, when training images are expressed using $b_i^j$ column vectors,

[Math. 2–19]

$$d_{(i,1)^j}, d_{(i,2)^j}, d_{(i,1)^j}, \ldots, d_{(i,b_i^j)^j} \quad (2\text{-}19)$$

$d_{(i,n)}{}^j$ is any training image therein.

Dictionary Learning Stage

Figure 14:
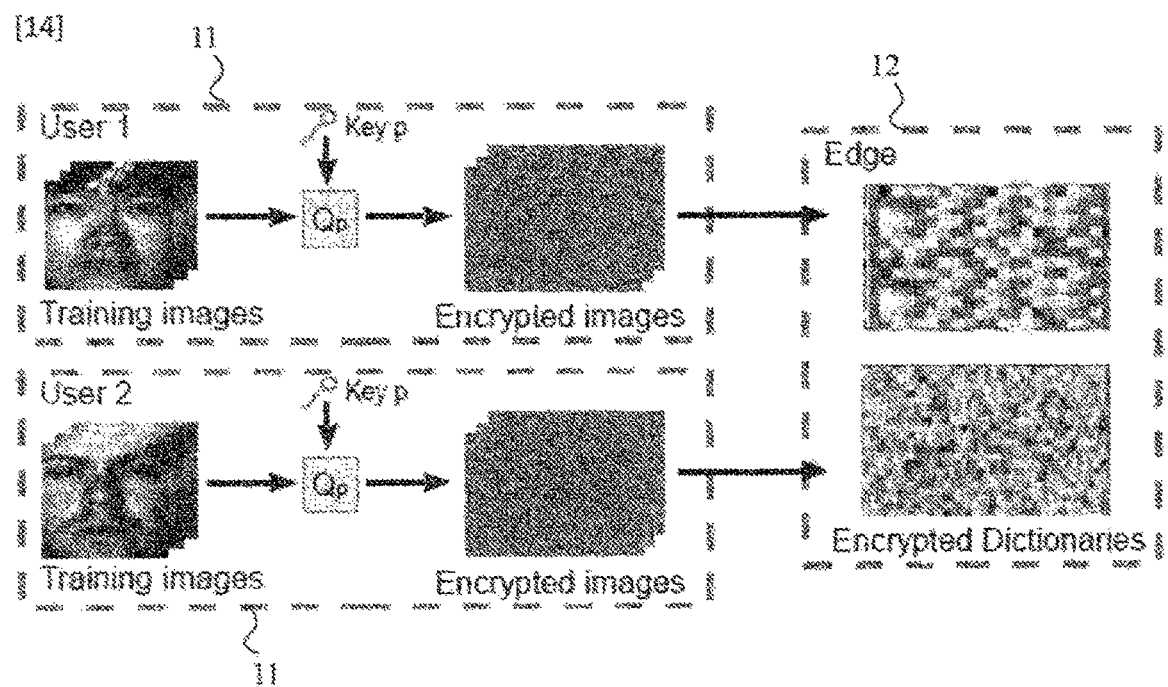
FIG. 14 is a diagram for explaining dictionary learning performed by the image recognition system according to the embodiment of the present disclosure.
Figure 15:
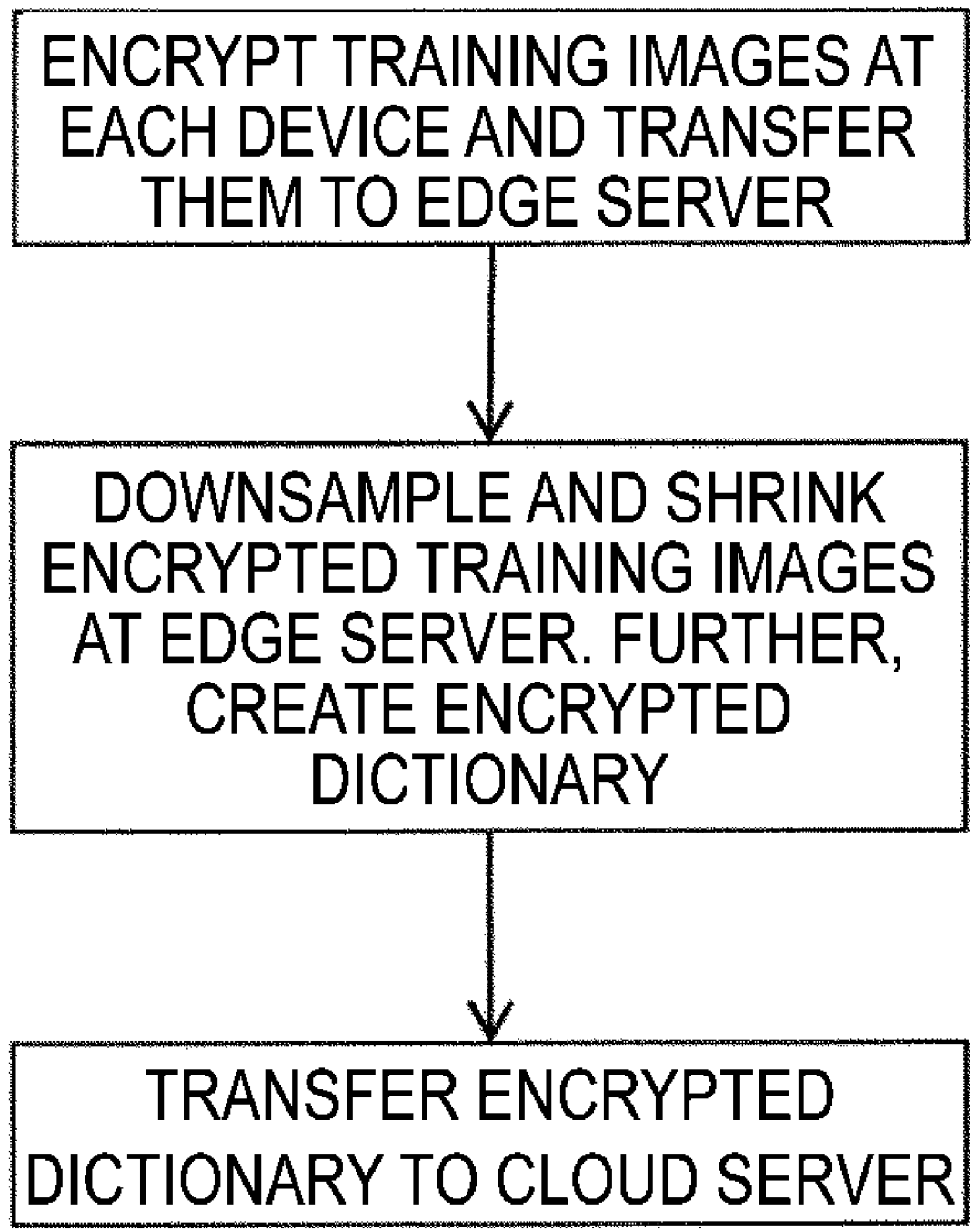
FIG. 15 is a diagram for explaining dictionary learning performed by the image recognition system according to the embodiment of the present disclosure.

The dictionary learning stage includes three steps, as illustrated in FIGS. 14 and 15. First, each of the devices j encrypts all the training samples and transfers them to the predetermined edge server 112. The encrypted training samples are then downsampled and shrunk, and the encrypted dictionary $D^{\wedge j}$, $\forall_j \in N$, is formulated as Math. 2-13. Finally, the encrypted dictionary DA is transferred to the cloud server. Note that Math. 2-13 represents the relationship between the encrypted dictionary and the plaintext dictionary, and in practice, the encrypted dictionary is generated from only the encrypted training samples, as illustrated in FIG. 14. For example, in FIG. 7, a person is represented by a linear weighted sum of three images, and an encrypted training sample is generated by encrypting each of the three images. Each element in the encrypted dictionary is an encrypted training sample (d1, d2, d3) itself (an array of elements of each person is an encrypted dictionary).

The encrypted dictionary has a smaller data size compared to the training sample. The training image itself is not transmitted to the cloud, and thus the network bandwidth required between the edge server and the cloud can be reduced.

Recognition Stage

Figure 16:
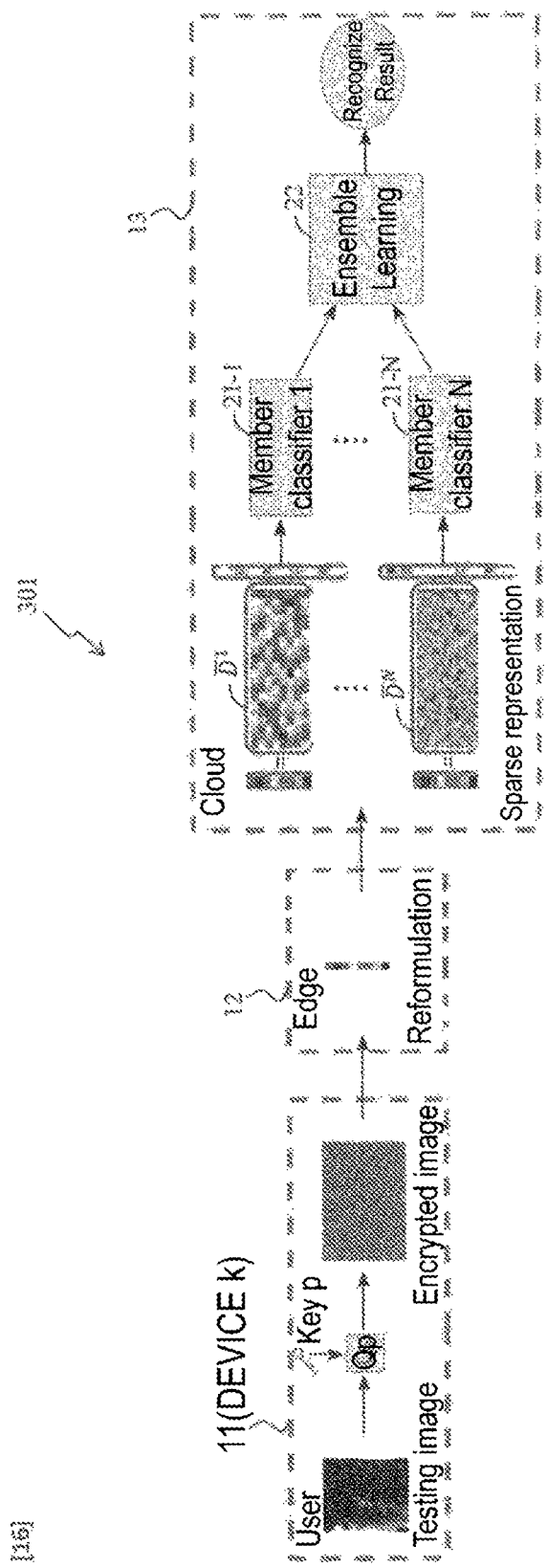
FIG. 16 is a diagram for explaining the image recognition operation performed by the image recognition system according to the embodiment of the present disclosure.
Figure 17:
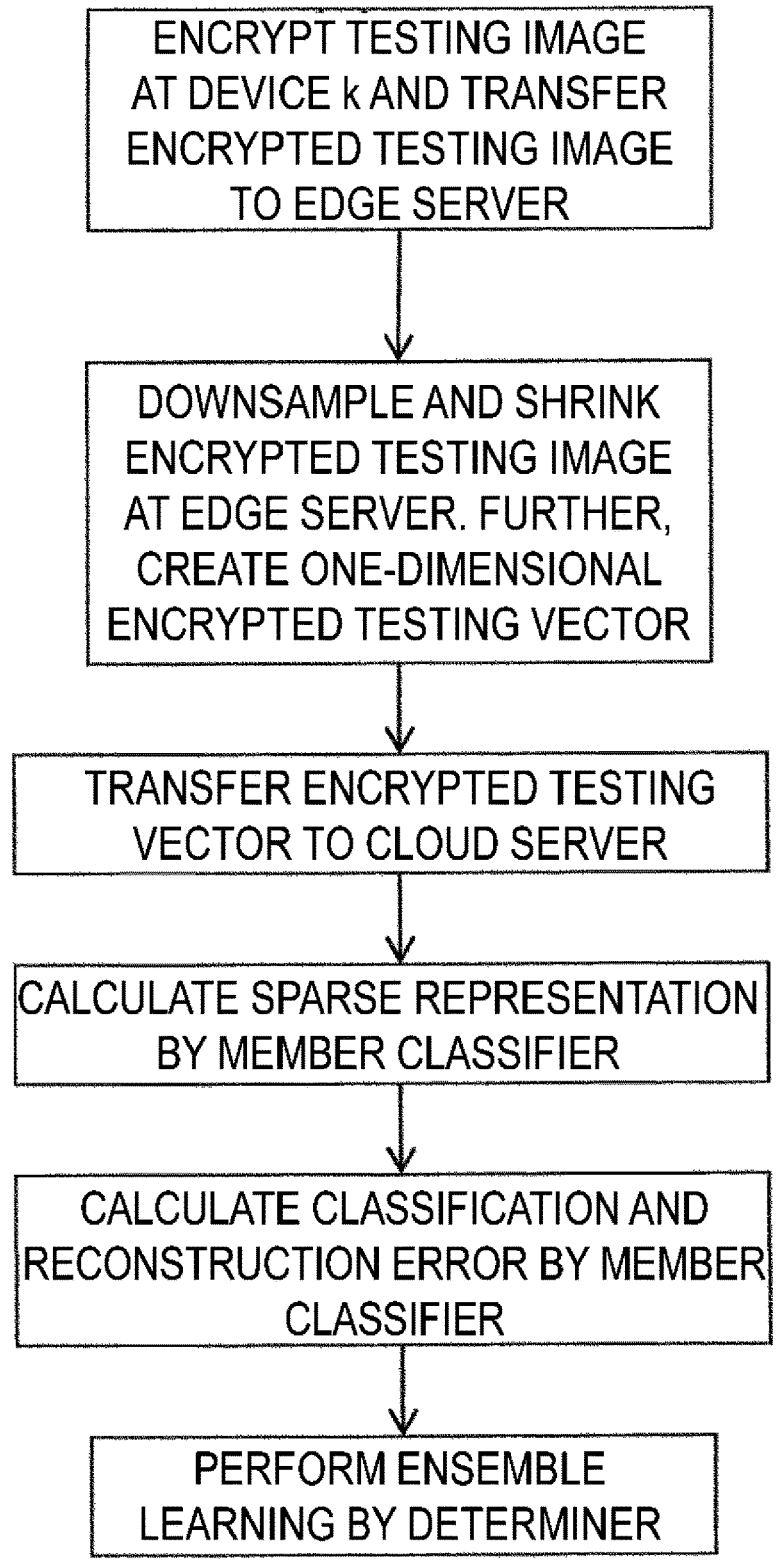
FIG. 17 is a diagram for explaining the image recognition operation performed by the image recognition system according to the embodiment of the present disclosure.

FIGS. 16 and 17 are diagrams for explaining the recognition stage. The cloud server 113 includes a plurality of member classifiers (121-1 to 121-N) and a determiner 122. In addition, the cloud server 113 holds a plurality of encrypted dictionaries ($D^{\wedge 1}$ to $D^{\wedge N}$).

First, a device k encrypts the testing image and transmits the encrypted testing image to the specified edge server 112. Then, the edge server 112 downsamples and shrinks the encrypted testing image, and creates a one-dimensional encrypted testing vector $y^{\wedge}$ k. The edge server 112 transmits the encrypted testing vector $y^{\wedge k}$ to the cloud server 113.

Each of the encrypted dictionaries functions as a member classifier in the ensemble learning framework. When the cloud server 113 receives the encrypted testing vector $y^{\wedge k}$, the member classifier 121-j (j∈N) solves Math. 2-14 to calculate the sparse representation $X^{\wedge (j,k)}$. Furthermore, the member classifier 121-j uses OMP to solve Math. 2-5 (or Math. 2-17) to determine a class to which the encrypted testing vector belongs, and calculates a reconstruction error (Math. 2-14a). The classification result and the reconstruction error are passed to the determiner 122. Finally, the determiner 122 solves Math. 2-6 for the classification result and the reconstruction error from each of the member classifiers to combine the results from the member classifiers (ensemble learning), and determines a class which gives the smallest reconstruction error.

Example 1

Figure 18:
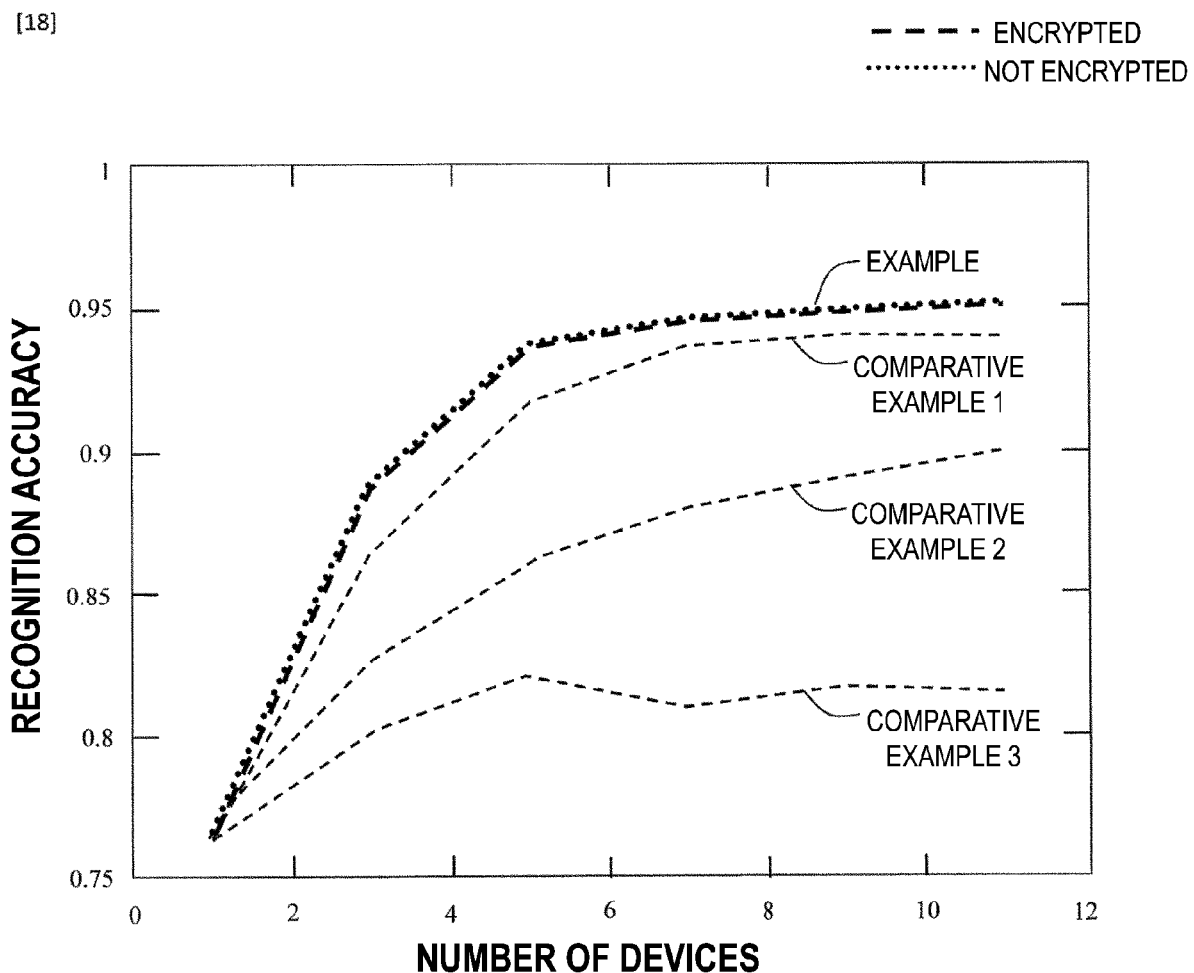
FIG. 18 is a diagram for explaining effects of the image recognition system according to the embodiment of the present disclosure.
Figure 19:
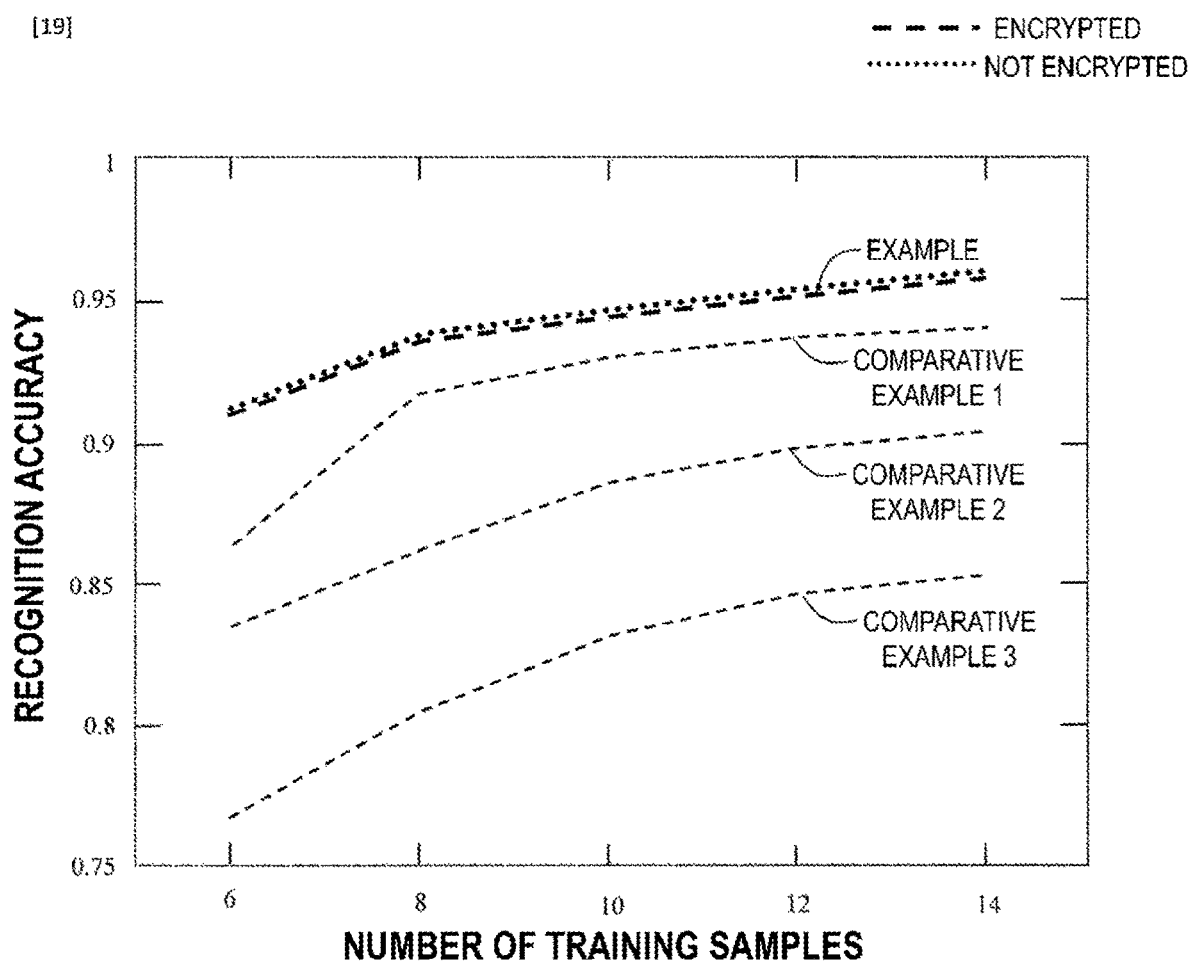
FIG. 19 is a diagram for explaining effects of the image recognition system according to the embodiment of the present disclosure.

Simulation results of comparing the image recognition method described in the embodiments with other image identification methods are shown in FIGS. 18 and 19. The other image identification methods include a method in which all training images are utilized to design a dictionary (LD: Large Dictionary), as Comparative Example 1, a method using ensemble learning in which a classification result is determined by using a majority vote (Vote), as Comparative Example 2, and the method described in NPL 2 (SRC), as Comparative Example 3. FIG. 18 shows a comparison of recognition accuracy with respect to the number of devices, and FIG. 19 shows a comparison of recognition accuracy with respect to the number of training samples. In both of the figures, the image recognition method described in the embodiments exhibits higher recognition performance than the other image identification methods.

Example 2

FIG. 20 shows a result of simulation of recognition accuracy. In FIG. 20, "Cloud" represents the image recognition method described in the embodiments. "Devices 1 to 5" in FIG. 20 show recognition accuracy when a dictionary generated by each device alone is used. FIG. 20 shows that the image recognition method described in the embodiments exhibits higher recognition performance than the method using a dictionary generated by each device alone. Furthermore, the image recognition method described in the embodiments exhibits higher recognition performance for a facial image than the case where a dictionary is created using all the training samples (LD). This can be considered as the effect of ensemble learning.

Example 3

Figure 21:
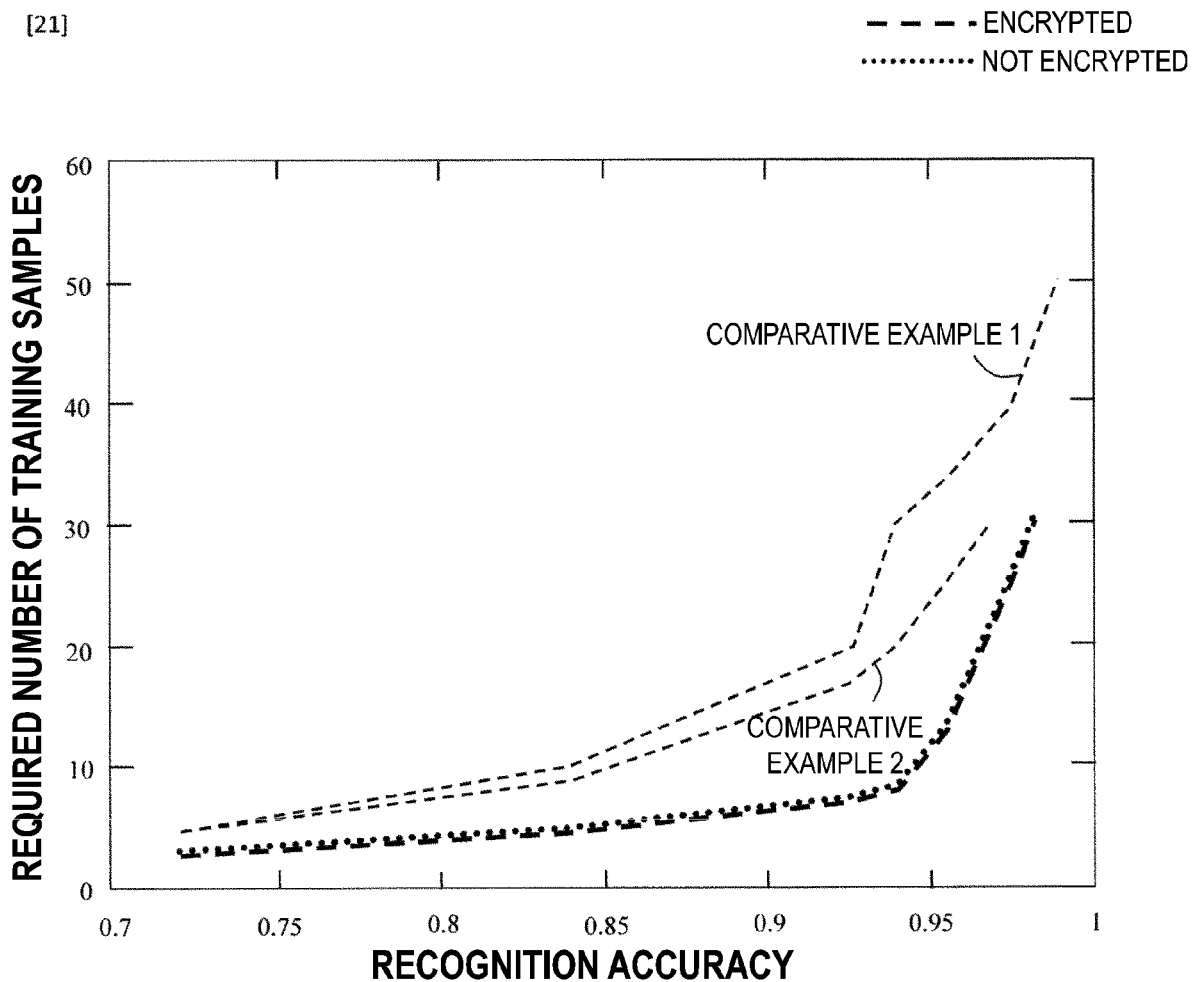
FIG. 21 is a diagram for explaining effects of the image recognition system according to the embodiment of the present disclosure.

FIG. 21 shows a result of simulation of recognition accuracy. FIG. 21 shows comparison of the number of training samples required to achieve the desired recognition accuracy, between the image recognition method described in the embodiments and other image identification methods. A method requiring fewer training samples can be considered to be a more accurate method of recognition. The other image identification methods include a dictionary learning method using deep learning (SPCNET), as Comparative Example 1, and a dictionary learning method using LC-KSVD, as Comparative Example 2. FIG. 21 shows that, even when a small number of training data are provided, the image recognition method described in the embodiments exhibits higher recognition performance, as compared to the other image identification methods. FIG. 21 also shows that when a large number of training data are provided, the image recognition method described in the embodiments exhibits recognition performance substantially equivalent to those of the other image identification methods.

Example 4

FIG. 22 shows a result of comparison of computational complexity, between the image recognition method described in the embodiments and other image identification methods. The other image identification methods include a dictionary learning method using deep learning (SPCNET), as Comparative Example 1, and a dictionary learning method using LC-KSVD, as Comparative Example 2. FIG. 22 shows that the image recognition method described in the embodiments exhibits a shorter computation time than the other image identification methods, for both the computation of dictionary learning and the computation of testing image recognition.

ADDITIONAL DESCRIPTION

With the image recognition system according to the present disclosure, it is possible to make the most of advantages of edge and cloud computing by utilizing multi-device diversity. To improve the performance of facial recognition, results based on dictionaries from different devices are combined to improve recognition performance.

It is very important to prevent privacy leakage, especially when sharing of calculation results at a cloud is allowed. The image recognition system according to the present disclosure has a framework for facial recognition that utilizes edges and cloud and that is based on sparse representation in which privacy protection is ensured.

(1) Privacy Protection by Random Unitary Transformation

As one of privacy protection methods, so-called secure computing, which is a method for computing encrypted data without decrypting it, has been actively studied. The secure computing is typically performed based on a multiparty protocol or homomorphic encryption. However, these methods have problems of difficulty in division, computational efficiency, and computational accuracy, and thus are not sufficiently utilized and used in only in limited applications, such as sorting processes and some statistical analyses. To address these problems, it is possible to employ a computationally non-intensive encryption algorithm based on random unitary transformation. The present embodiment describes both theoretical proof and demonstration by simulation that such encryption does not affect results of facial recognition.

(2) Utilization of Multi-Device Diversity by Ensemble Learning

The performance of a dictionary-based facial recognition algorithm depends significantly on the number of training samples. In such a case, it is difficult to gather all training samples at the cloud, due to reasons as to bandwidth and storage costs. In the present embodiment, the diversity provided by the cloud is utilized to integrate, through ensemble learning, only the recognition results based on the dictionaries generated at different devices. Further, as a result of the simulation, it is proved that the present embodiment is robust (noise-robust) and can achieve a high recognition rate.

REFERENCE SIGNS LIST

11: Local processing unit
12: Edge/cloud processing unit
13: Main loop unit
21: Dictionary learning unit
22: Random unitary transformation unit
23: Cache unit
24: Transmission unit
25: Reception unit
26: Database unit
31: Initialization unit
32: Approximation error calculation unit
33: Support update unit
34: Best solution search unit
35: Residual error update unit
36: Computation stop unit
37: Sparse coefficient output unit
111: Terminal (device)
112: Transfer server (edge server)
113: Image recognition server (cloud server)
121: Member classifier
122: Discriminator
301: Image recognition system

The invention claimed is:

1. An image recognition system, comprising N terminals (N is an integer not less than 2), M transfer servers (M is an integer not less than 1), and an image recognition server, wherein each of the N terminals, M transfer servers and the image recognition server are implemented by a processor and a memory having computer program instructions stored thereon and executed by the processor, wherein when an image $y_i^j$ is expressed, by using a dictionary matrix $D_i^j$ being an M×K matrix having, as elements of the M×K matrix, K (K>M) bases, and a sparse coefficient $X_i^j$ being a K-dimensional vector, as $y_i^j = D_i^j \cdot X_i^j$, where i is a class to which an image to be identified belongs, and j and k (k∈j) are numbers of the terminals, the terminals are configured to encrypt a testing image using a random unitary matrix Qp generated by using a key p, to generate an encrypted testing image, and transfer the encrypted testing image to a specified one of the transfer servers, the transfer servers are configured to downsample the encrypted testing image, transform the downsampled and encrypted testing image to a one-dimensional encrypted image vector, and transfer the encrypted image vector to the image recognition server, and the image recognition server is configured to use a plurality of encrypted dictionaries generated by encrypting, by using the random unitary matrix Op, a plurality of dictionaries generated using different training images, to solve, by Orthogonal Matching Pursuit, an optimization problem represented by Math. C1 for each of the plurality of encrypted dictionaries, to estimate a class, to which the encrypted image vector belongs, for each of the plurality of the encrypted dictionaries, and is further configured to perform ensemble learning on the class estimated for each of the plurality of the encrypted dictionaries to determine a single class to which the encrypted image vector belongs:

[Math. C1]

$$\tilde{X}^{(j,k)} = \arg\min_{X^j} \|\overline{D}^j X^j - \overline{y}^k\|_2 \ s.t. \ \|X^j\|_0 \le \epsilon \tag{C1}$$

where, $\overline{D}^j$ is the encrypted dictionary of a terminal of number j, $X^j$ is a sparse coefficient of the terminal of number j, and $\overline{y}^k$ is the encrypted image vector generated by downsampling the encrypted testing image from the terminal of number k (k∈j) and transforming the encrypted testing image to a one-dimensional vector.

2. An image recognition server, comprising:

a processor; and a memory having computer program instructions stored thereon, when executed by the processor, perform to:

receive an encrypted image vector and a plurality of encrypted dictionaries, the encrypted image vector being generated by downsampling an encrypted testing image and transforming the downsampled and encrypted testing image to a one-dimensional vector, the encrypted testing image being generated by encrypting a testing image using a random unitary matrix Qp generated by using a key p, the plurality of encrypted dictionaries being generated by encrypting, by using the random unitary matrix Qp, a plurality of dictionaries generated using different training images; and solve, by Orthogonal Matching Pursuit, an optimization problem represented by Math. C1 for each of the plurality of encrypted dictionaries, to estimate a class, to which the encrypted image vector belongs, for each of the plurality of the encrypted dictionaries, and further configured to perform ensemble learning on the class estimated for each of the plurality of the encrypted dictionaries to determine a single class to which the encrypted image vector belongs:

[Math. C1]

$$\tilde{X}^{(j,k)} = \arg\min_{X^j} \|\overline{D}^j X^j - \overline{y}^k\|_2 \ s.t. \ \|X^j\|_0 \le \epsilon \tag{C1}$$

where, $\overline{D}^j$ is the encrypted dictionary of a terminal of number j, $X^j$ is a sparse coefficient of the terminal of number j, and $\overline{y}^k$ is the encrypted image vector generated by downsampling the encrypted testing image from the terminal of number k (k∈j) and transforming the encrypted testing image to a one-dimensional vector;

where the terminals are configured to encrypt a testing image using a random unitary matrix Qp generated by using a key p, to generate an encrypted testing image, and transfer the encrypted testing image to a specified one of the transfer servers.

3. An image recognition method performed in an image recognition system including N terminals (N is an integer not less than 2), M transfer servers (M is an integer not less than 1), and an image recognition server, the method comprising:

when an image yl is expressed, by using a dictionary matrix $D_i^j$ being an M×K matrix having, as elements of the M×K matrix, K (K>M) bases, and a sparse coefficient $X_i^j$ being a K-dimensional vector, as $y_i^j = D_i^j \cdot X_i^j$, where i is a class to which an image to be identified belongs, and j and k (k∈j) are numbers of the terminals, encrypting, by the terminals, a testing image using a random unitary matrix Qp generated by using a key p, to generate an encrypted testing image, and transferring the encrypted testing image to a specified one of the transfer servers;

downsampling, by the transfer servers, the encrypted testing image, transforming the downsampled and encrypted testing image to a one-dimensional encrypted image vector, and transferring the encrypted image vector to the image recognition server; and using, by the image recognition server, a plurality of encrypted dictionaries generated by encrypting, by using the random unitary matrix Qp, a plurality of dictionaries generated using different training images, to solve, by Orthogonal Matching Pursuit, an optimization problem represented by Math. C1 for each of the plurality of encrypted dictionaries, to estimate a class, to which the encrypted image vector belongs, for each of the plurality of the encrypted dictionaries, and performing ensemble learning on the class estimated for each of the plurality of the encrypted dictionaries to determine a single class to which the encrypted image vector belongs:

[Math. C1]

$$\tilde{X}^{(j,k)} = \arg\min_{X^j} \|\overline{D}^j X^j - \overline{y}^k\|_2 \ s.t. \ \|X^j\|_0 \le \epsilon \tag{C1}$$

where, $\overline{D}^j$ is the encrypted dictionary of a terminal of number j, $X^j$ is a sparse coefficient of the terminal of number j, and $\overline{y}^k$ is the encrypted image vector generated by downsampling the encrypted testing image from the terminal of number k (k∈j) and transforming the encrypted testing image to a one-dimensional vector.

* * * * *